(12) United States Patent
Kochi et al.

(10) Patent No.: US 7,747,151 B2
(45) Date of Patent: *Jun. 29, 2010

(54) IMAGE PROCESSING DEVICE AND METHOD

(75) Inventors: Nobuo Kochi, Tokyo (JP); Tetsuji Anai, Tokyo (JP); Hitoshi Otani, Tokyo (JP)

(73) Assignee: Topcon Corporation, Tokyo (JP)

( * ) Notice: Subject to any disclaimer, the term of this patent is extended or adjusted under 35 U.S.C. 154(b) by 277 days.

This patent is subject to a terminal disclaimer.

(21) Appl. No.: 11/798,190

(22) Filed: May 10, 2007

(65) Prior Publication Data

US 2007/0263924 A1 Nov. 15, 2007

(30) Foreign Application Priority Data

May 10, 2006 (JP) ............................. 2006-132011
Apr. 6, 2007 (JP) ............................. 2007-100679

(51) Int. Cl.
*G03B 17/00* (2006.01)
*G06K 9/00* (2006.01)
*H04N 13/02* (2006.01)

(52) U.S. Cl. ............................. 396/55; 382/154; 348/50

(58) Field of Classification Search .................... 396/55, 396/222, 324, 335; 382/103, 106, 154; 348/46, 348/50, 169, 172

See application file for complete search history.

(56) References Cited

U.S. PATENT DOCUMENTS

| | | | |
|---|---|---|---|
| 6,047,134 A | 4/2000 | Sekine et al. | |
| 6,961,446 B2 | 11/2005 | Imagawa et al. | |
| 6,985,075 B2 | 1/2006 | Takeda | |
| 7,010,157 B2 | 3/2006 | Kochi et al. | |
| 7,126,630 B1 | 10/2006 | Lee et al. | |
| 7,181,081 B2 | 2/2007 | Sandrew | |
| 7,193,626 B2 | 3/2007 | Otani et al. | |
| 2001/0045979 A1* | 11/2001 | Matsumoto et al. | 382/154 |
| 2001/0045980 A1 | 11/2001 | Leonard | |
| 2004/0066454 A1 | 4/2004 | Otani et al. | |
| 2007/0263924 A1 | 11/2007 | Kochi et al. | |

FOREIGN PATENT DOCUMENTS

EP 1 750 090 A2 2/2007
JP 2003-264852 9/2003

OTHER PUBLICATIONS

Koch, et al: "Automatic 3D Model Acquisition From Uncalibrated Image Sequences" Computer Graphics International, Jun. 22, 1998, pp. 597-604.

(Continued)

*Primary Examiner*—Christopher E Mahoney
*Assistant Examiner*—Autumn Parker
(74) *Attorney, Agent, or Firm*—Foley & Lardner LLP

(57) ABSTRACT

An image processing device is provided that can precisely measure the photographing position or posture of a photographing device or the coordinates of an object based on sequentially changing photographed images. A series of sequentially photographed images are acquired, from which feature points are extracted. The feature points are tracked and correlated to each other. Stereo images are selected from the series of photographed images correlated, and subjected to an orientation and a 3D measurement. The error range of corresponding points obtained by the 3D measurement is calculated. Based on the calculated error range, it is determined whether or not the corresponding points are appropriate for 3D measurement. Those corresponding points determined as inappropriate are deleted. Another orientation and another 3D measurement are performed using those corresponding points excluding the deleted ones, thus improving the measurement precision.

15 Claims, 17 Drawing Sheets

OTHER PUBLICATIONS

Meltzer, et al: "Simultaneous Localization and Mapping Using Multiple View Feature Descriptors", International Conference on Intelligent Robots and Systems, vol. 2, Sep. 28, 2004, pp. 1550-1555.

Huynh, et al: "Robust Factorization for the Affine Camera: Analysis and Comparison" Seventh International Conference on Control, Automation, Robotics and Vision, Dec. 2, 2002, pp. 126-131.

D. Nistér et al., "Visual Odometry," Proceedings of the 2004 IEEE Computer Society Conference on Computer Vision and Pattern Recognition (CVPR'04), vol. 1, Jun. 2004, pp. 652-659.

G. Medioni et al., "Generation of a 3-D Face Model from One Camera," Pattern Recognition 2002, IEEE Computer Society 16th International Conference, vol. 3, Aug. 11, 2002, pp. 667-671.

H. P. Moravec, "Towards Automatic Visual Obstacle Avoidance", Proc. 5th International Joint Conference on Artificial Intelligence, 1977, 3 pgs.

M. Pollefeys et al., "Video-to-3D," Proceedings of Photogrammetric Computer Vision 2002, 2002, pp. 1-12.

S. Gibson et al., "Accurate Camera Calibration for Off-line, Video-Based Augmented Reality," Proceedings of the International Symposium on Mixed and Augmented Reality (ISMAR'02), Sep. 30-Oct. 1, 2002, pp. 1-10.

T. Anai et al., U.S. PTO Office Action, U.S. Appl. No. 11/730,747, dated Jul. 8, 2009, 21 pgs.

T. Thormählen et al., "Keyframe Selection for Camera Motion and Structure Estimation from Multiple Views," Proceedings of the ECCV 2004, pp. 523-535.

Y. Yokochi et al., "Extrinsic Camera Parameter Estimation Based-on Feature Tracking and GPS Data," Computer Vision—ACCV 2006, Proceedings of the 7th Asian Conference on Computer Vision, Part I (Lecture Notes in Computer Science vol. 3851), 2006, pp. 369-378.

U.S. Appl. No. 11/567,909, filed Dec. 7, 2006, Tetsuji Anai et al.

U.S. Appl. No. 11/905,404, filed Sep. 28, 2007, Nobuo Kochi et al.

Simon Gibson et al., Accurate Camera Calibration for Off-line, Video-Based Augmented Reality, IEEE Proceedings of the International Symposium on Mixed and Augmented Reality, 2002, pp. 1-10.

T. Anai et al., U.S. PTO Notice of Allowance, U.S. Appl. No. 11/730,747, dated Feb. 19, 2010, 10 pgs.

T. Anai, U.S. PTO Office Action, U.S. Appl. No. 11/567,909, dated Apr. 19, 2010, 15 pages.

N. Kochi, U.S. PTO Office Action, U.S. Appl. No. 11/905,404, dated May 4, 2010, 10 pages.

* cited by examiner

IMAGE PROCESSING DEVICE AND METHOD

BACKGROUND OF THE INVENTION

1. Technical Field

The present invention relates to an image processing device and method. More particularly, the present invention relates to an image processing device and method for measuring the coordinates of a photographing device or an object by keeping track of a dynamic image of the object taken when the photographing device moves relative to the object.

2. Related Art

There is known a technique to measure the position of a photographing device by continuously photographing an object while the photographing device is moving relative to the object. When the photographing device is actually mounted on a moving body such as a car or held in the hand of a person to perform photographing, however, the acquired images may occasionally be far from stable and require vertical or rotational corrections frame by frame, due to the sway of the car or the person. In some cases, a moving object such as another car or person, a flying bird or a falling leaf, may intervene between the photographing device and the object, causing feature points (this may referred to as characteristic points) to be hidden behind and reappear again. Movement in a three-dimensional (3D) space may occasionally be difficult to perceive when viewed on a two-dimensional (2D) image. Thus, there is a need for a process to deal with such sway of the photographing device, a process to deal with feature points that disappear and reappear, and a process to identify and delete feature points and corresponding points inappropriate for 3D measurement. On other hand, for the case where a stationary object is photographed with a stationary photographing device, there is disclosed a 3D measurement technique to precisely and automatically search for corresponding points for measurement. (See Patent Document 1.)

[Patent Document 1] JP-A-2003-264852 (paragraphs [0018] to [0073], FIGS. 1 to 11, etc.)

In order to measure the 3D coordinates of a photographing device or an object based on moving images, it is necessary to find, on two or more frames of the moving image, feature points corresponding to each other, or identical points on the object (hereinafter referred to "corresponding feature points") and to keep track of them. In the case where movement is made in the depth direction of a 3D space when corresponding feature points are to be obtained, for example, such movement cannot be recognized as movement when viewed two-dimensionally. Rather, so-called "pseudo feature points" and "pseudo reference points", which are recognized on the image at corners of two or more lines at different depth levels in the 3D space, prevent proper removal of erroneous corresponding points. Conventional analysis of a moving image is based on the evaluation of 2D movement of points, and not 3D movement thereof. Erroneous corresponding points that could not be properly removed consequently deteriorate the measurement precision of 3D coordinates and reduce the reliability of the measurement.

Thus, it is required to provide a technique that can precisely measure the photographing position and posture of a photographing device and the coordinates of an object from photographed images that sequentially change such as a moving image, even in the case where it is necessary to identify and delete feature points and corresponding points inappropriate for 3D measurement, by developing and applying the technique to photograph a stationary object with a stationary photographing device described above to the case where either or both of them are mobile.

The objective of the present invention is to provide an image processing device and method that can precisely measure the photographing position or posture of a photographing device or the coordinates of an object based on sequentially changing photographed images, such as moving images.

SUMMARY OF THE INVENTION

To achieve the objective, an image processing device 100 related to aspect (1) of the present invention comprises: as shown in FIG. 2 for example, a photographed image acquisition section 2 for acquiring a series of sequentially photographed images of a relatively moving object where three or more adjacent images have an overlapping area with each other; a feature extraction section 3 for extracting feature points from any of the sequentially photographed images; a feature point tracking section 4 for tracking and correlating the feature points for the series of photographed images; a stereo image selection section 6 for selecting stereo images from the series of photographed images, the stereo images being a pair of images; an orientation process/three-dimensional (3D) measurement section 7 for performing an orientation and a 3D measurement using corresponding feature points, the corresponding feature points being the feature points correlated in the stereo images selected by the stereo image selection section 6; an error range calculation section 81 for calculating an error range of 3D coordinates of the corresponding feature points obtained from the stereo images in the 3D measurement; a corresponding point appropriateness determination section 83 for determining whether or not the corresponding feature points are appropriate for 3D measurement based on the error range of the 3D coordinates of the corresponding feature points calculated by the error range calculation section 81; and an erroneous corresponding point deletion section 84 for deleting corresponding feature points determined as inappropriate by the corresponding point appropriateness determination section 83.

Here, referring to the term "relatively moving object", typically the object is photographed when either one of the object or the photographing device moves while the other is stationary during photographing, but it may be photographed when both are mobile. That is, both may be mobile relative to each other during photographing. With three or more images having an overlapping area with each other, it is possible to keep track of the feature points. The number of images having an overlapping area is desired to be larger to improve the measurement precision of coordinates, preferably 10 or more, more preferably 50 or more, for example. The term "series of sequentially photographed images" refers to photographed images acquired sequentially over time, which may be images extracted from frames of moving images captured continuously with a video camera, or images photographed sequentially at appropriate time intervals with a still camera. Such images may be acquired from all the frames, or from every several frames, of moving images. The feature points are tracked sequentially as follows. For a feature point in a first image, a corresponding point is searched for in a second image, and when found, correlated to the feature point in the first image; then for the corresponding point in the second image now as a new feature point, a corresponding point is searched for in a third image, and when found, correlated to the feature point in the second image; etc. Here, feature points in a series of photographed images that are correlated with each other are referred to as "corresponding feature points".

The feature points appear newly, disappear and reappear over time, so at least three of the series of photographed images need to have their feature points correlated to each other. Stereo images are preferably selected from rectified images, which are the series of photographed images in which the position, magnification and tilt have been corrected and from which vertical parallax has been eliminated by reflecting the tracking process, but also may be selected from the images as originally acquired as they can be correlated with each other in the orientation process and 3D measurement. The term "orientation" refers to a process of calculating the photographing position and tilt of the photographing device, and the term "3D measurement" refers to a process of calculating the 3D coordinates of each feature point. The language "determining based on error range" refers to making a determination using the calculated error range, for example based on the size of the error range, the presence or absence of overlap between the error ranges, etc. "Whether or not the corresponding feature points are appropriate for 3D measurement" is determined with an intention to remove as inappropriate erroneous corresponding points, which are feature points that might deteriorate the precision of 3D coordinate measurement (hence feature points that might adversely affect the orientation). Besides those corresponding points which do not actually correspond to each other but which erroneously have been correlated to each other, the erroneous corresponding points include those feature points attached to an object that moves differently than the object to be photographed, pseudo feature points, pseudo reference points, etc.

With this constitution, an image processing device can be provided that can precisely measure the photographing position or posture of a photographing device or the coordinates of an object based on sequentially changing photographed images, such as moving images, where it is required to identify and delete those feature points and corresponding points inappropriate for 3D measurement, by performing 3D measurement after removing such inappropriate feature points and corresponding points.

The aspect (2) of the present invention is the image processing device as recited in aspect (1), wherein the orientation process/3D measurement section 7 performs another orientation and another 3D measurement using those corresponding feature points excluding the corresponding feature points deleted by the erroneous corresponding point deletion section 84.

With this constitution, high-precision 3D coordinates can be obtained from corresponding feature points excluding erroneous corresponding points.

The aspect (3) of the present invention is the image processing device as recited in aspect (1) or (2), wherein the corresponding point appropriateness determination section 83 determines as inappropriate those corresponding feature points in the stereo images with the error range exceeding a predetermined threshold. Here, the predetermined threshold is, for example, $k \times \Delta xy$ or $k \times \Delta z$, where $\Delta xy$ is In-plane resolution and $\Delta z$ is Depth resolution.

With this constitution, stereo images with a small error range can be used for 3D measurement, thus increasing the precision of the 3D coordinates. In addition, inappropriate corresponding feature points can be automatically removed using a predetermined threshold.

The aspect (4) of the present invention is the image processing device as recited in any one of aspects (1) to (3), further comprises: an allowable range setting section 82 for setting an overlapping area of the error ranges of a plurality of different stereo images as an allowable range of the corresponding feature points, wherein the corresponding point appropriateness determination section 83 determines those corresponding feature points in the stereo images with an overlapping area between the error range and the allowable range as appropriate, and those without an overlapping area therebetween as inappropriate.

With this constitution, erroneous corresponding points outside the error range for 3D measurement can be reliably removed. In addition, pseudo feature points, which could not be discriminated using 2D images, can also be removed.

The aspect (5) of the present invention is the image processing device as recited in any one of aspects (1) to (3), further comprises: an allowable range setting section 82 for setting an overlapping area of the error ranges of a plurality of different stereo images as an allowable range of the corresponding feature points, wherein the corresponding point appropriateness determination section 83 determines those corresponding feature points existing inside the allowable range as appropriate, and those existing outside the allowable range as inappropriate.

With this constitution, corresponding feature points with high accuracy can be selected for use in 3D measurement, thus improving the precision of the 3D coordinates.

The aspect (6) of the present invention is the image processing device as recited in aspect (4) or (5), wherein the allowable range setting section 82 sets, as an allowable range of the corresponding feature points, an overlapping area of the error ranges in a predetermined number or more of the stereo images.

Here, the term "allowable range" refers to a range presumed based on the error ranges where the positional coordinates of corresponding points are allowed. With this constitution, the positional coordinates of corresponding feature points can be estimated to be within the allowable range.

The aspect (7) of the present invention is the image processing device as recited in aspect (6), wherein a center of gravity of those corresponding feature points in the stereo images with an overlapping area with the allowable range is obtained using a weighting factor that is 1 or a decreasing function of the error range, and the center of gravity is determined as a positional coordinate of the corresponding feature points.

Here, the weighting factor may be 1, for example in the case where those corresponding feature points with an error range exceeding a predetermined threshold are judged as inappropriate. With this constitution, the positional coordinates of corresponding feature points can be determined with generally high accuracy.

The aspect (8) of the present invention is the image processing device as recited in any one of aspects (1) to (7), wherein the orientation process/3D measurement section forms rectified images by rectifying the stereo images, and performs a 3D measurement based on the rectified images.

With this constitution, 3D measurement can be performed easily and precisely by performing the rectification process.

The aspect (9) of the present invention is the image processing device as recited in any one of aspects (1) to (8), wherein the error range ($\sigma_{xy}$, $\sigma_z$) is calculated as a function of a baseline length B, a photographing distance H, a focal length f and a pixel size $\Delta p$.

With this constitution, the error range can be calculated appropriately and automatically.

The aspect (10) of the present invention is the image processing device as recited in any one of aspects (3) to (9), further comprises: a storage section 9 for storing data indicating an assumed error range in a measurement obtained by substituting the necessary elements (H: photographing distance, $\Delta p$: pixel resolution, f: focal length, B: Base line length, k1, k2: Coefficients, etc.) to equations (8) and (9) expressing the correspondence between the stereo images and the error range, wherein the stereo image selection section 6 selects stereo images with an error range not more than a predetermined threshold.

With this constitution, stereo images with a small error range can be selected for use in 3D measurement, thus increasing the precision of the 3D coordinates.

The aspect (11) of the present invention is the image processing device as recited in any one of aspects (3) to (9), further comprises: a storage section 9 for storing data indicating an assumed error range in a measurement based on correspondence between the stereo images and the error range, wherein the stereo image selection section 6 selects stereo images with an error range within a predetermined range based on the error range data.

With this constitution, stereo images with uniform error ranges (for example, where the photographing distance is approximately equal) can be used to obtain uniform measurement results.

The aspect(12) of the present invention is the image processing device as recited in any one of aspects (4) to (11), further comprises: a storage section 9 for storing data indicating correspondence between the corresponding feature points and the allowable range, wherein the stereo image selection section 6 selects stereo images with an error range overlapping the allowable range based on the data indicating an assumed error range in a measurement obtained by substituting the necessary elements (H: photographing distance, $\Delta p$: pixel resolution, f: focal length, B: Base line length, k1, k2: Coefficients, etc.) to equations (8) and (9).

With this constitution, corresponding feature points with high accuracy that are the actual feature points can be selected for use in 3D measurement, whereby high-precision 3D coordinates can be obtained.

The aspect (13) of the present invention is the image processing device as recited in any one of aspects (1) to (12), further comprises: a storage section 9 for storing measurement precision obtained by measurement, utilizing an equation (9) expressing a relation between the baseline length of the stereo images and the measurement precision of the 3D coordinates, and data of a baseline length satisfying required precision obtained by substituting the necessary elements (H: photographing distance, $\Delta p$: pixel resolution, f: focal length, k1, k2: Coefficients, etc.), wherein the stereo image selection section 6 selects stereo images with a baseline length satisfying the required precision.

With this constitution, 3D measurement can be performed while satisfying the required performance.

The aspect (14) of the present invention is the image processing device as recited in any one of the aspects (1) to (13), further comprises: a photographing position measurement section that can measure a photographing position without being based on the photographed images.

This constitution is convenient for real time processing, because the photographing position can be measured without tracking the photographed images and independently of the photographed images.

The aspect (15) of the present invention is the image processing device as recited in any one of aspects (1) to (14), further comprises: a display device for presenting a stereoscopic two-dimensional display of the error range or the allowable range, wherein the photographed image acquisition section includes a photographing device for photographing a series of photographed images.

This constitution allows for on-site photographing, and also judgment of erroneous corresponding points, such as false feature points, by means of stereoscopic two-dimensional display.

A image processing method related to aspect (16) of the present invention for processing an image, comprises: as shown in FIG. 3 for example, a photographed image acquisition step (S100) of acquiring a series of sequentially photographed images of a relatively moving object where three or more adjacent images have an overlapping area with each other; a feature extraction step (S110) of extracting feature points from any of the sequentially photographed images; a feature point tracking step (S120) of tracking and correlating the feature points for the series of photographed images; a stereo image selection step (S140) of selecting stereo images from the series of photographed images, the stereo images being a pair of images; a first orientation step (S150) of performing an orientation using corresponding feature points, the corresponding feature points being the correlated feature points in the stereo images selected in the stereo image selection step (S140); a first 3D measurement step (S160) of performing a 3D measurement using orientation results in the first orientation step (S150); an error range calculation step (S170) of calculating an error range of 3D coordinates of the corresponding feature points obtained from the stereo images in the 3D measurement; a corresponding point appropriateness determination step (S185) of determining whether or not the corresponding feature points are appropriate for 3D measurement based on the error range of the 3D coordinates of the corresponding feature points calculated in the error range calculation step; and an erroneous corresponding point deletion step (S190) of deleting those corresponding feature points determined as inappropriate in the corresponding point appropriateness determination step (S185).

With this constitution, an image processing method by which the photographing position or posture of a photographing device or the coordinates of an object can be precisely measured based on sequentially changing photographed images, such as moving images, where it is required to identify and delete those feature points and corresponding points inappropriate for 3D measurement, by performing 3D measurement after removing such inappropriate feature points and corresponding points.

The aspect (17) of the present invention is the image processing method as recited in aspect (16), further comprises: a second orientation step (S150) of performing another orientation using those corresponding feature points excluding the corresponding feature points deleted in the erroneous corresponding point deletion step (S190); and a second 3D measurement step (S160) of performing a 3D measurement using orientation results in the second orientation step (S150).

With this constitution, high-precision 3D coordinates can be obtained by performing 3D measurement after erroneous corresponding points are removed.

The aspect (18) of the present invention is a computer readable program for causing a computer to perform the method for processing an image as recited in aspect (16) or (17).

The present invention can provide an image processing device and method that can precisely measure the photographing position or posture of a photographing device or the coordinates of an object based on sequentially changing photographed images, such as moving images.

This application is based on the Patent Applications No. 2006-132011 filed on May 10, 2006 in Japan and No. 2007-100679 filed on Apr. 6, 2007 in Japan, the contents of which are hereby incorporated in its entirety by reference into the present application, as part thereof.

The present invention will become more fully understood from the detailed description given hereinbelow. However, the detailed description and the specific embodiment are illustrated of desired embodiments of the present invention and are described only for the purpose of explanation. Various changes and modifications will be apparent to those ordinary skilled in the art on the basis of the detailed description.

The applicant has no intention to give to public any disclosed embodiment. Among the disclosed changes and modifications, those which may not literally fall within the scope of the patent claims constitute, therefore, a part of the present invention in the sense of doctrine of equivalents.

The use of the terms "a" and "an" and "the" and similar referents in the context of describing the invention (especially in the context of the following claims) are to be construed to cover both the singular and the plural, unless otherwise indicated herein or clearly contradicted by context. The use of any and all examples, or exemplary language (e.g., "such as") provided herein, is intended merely to better illuminate the invention and does not pose a limitation on the scope of the invention unless otherwise claimed.

DETAILED DESCRIPTION OF THE PREFERRED EMBODIMENT

The embodiments of the present invention are hereinafter described with reference to the drawings.

First Embodiment

Figure 1:
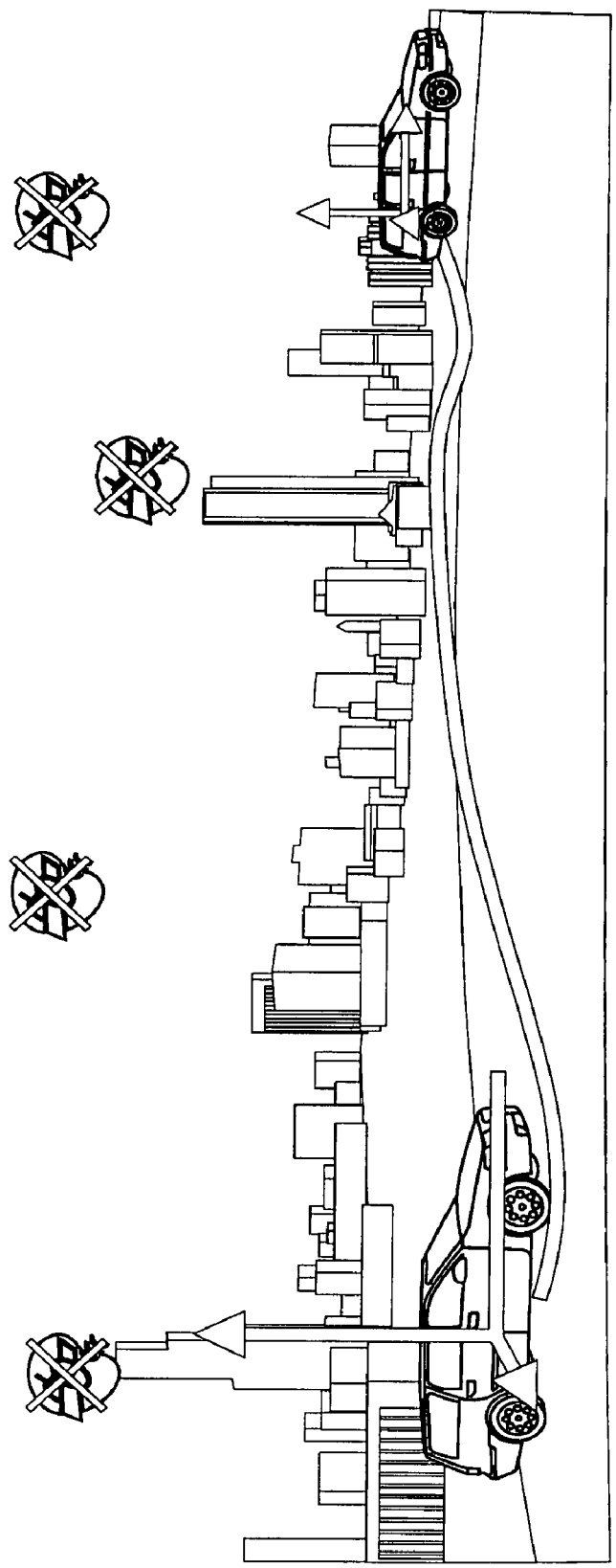
FIG. 1 is a view for explaining the concept of a first embodiment.

FIG. 1 is a view for explaining the concept of this embodiment. In this example, a camera is mounted on a car to photograph the scene of a street as an object over time, or while gradually changing the position of the car, and the positional coordinates of the camera, or the tracks of the car, are obtained from the results of tracking using the plurality of photographed images. This technique enables car navigation systems to continuously display the position of the car, and more importantly complements such systems in areas where GPS radio waves cannot be received. In the embodiments described below, erroneous corresponding points in the photographed images, such as erroneously correlated feature points and feature points with movement or great sway, are removed as inappropriate for use to obtain the positional coordinates of the camera. In the first embodiment, the appropriateness of feature points is determined based on the presence or absence of overlap between the allowable range and the error range.

Figure 2:
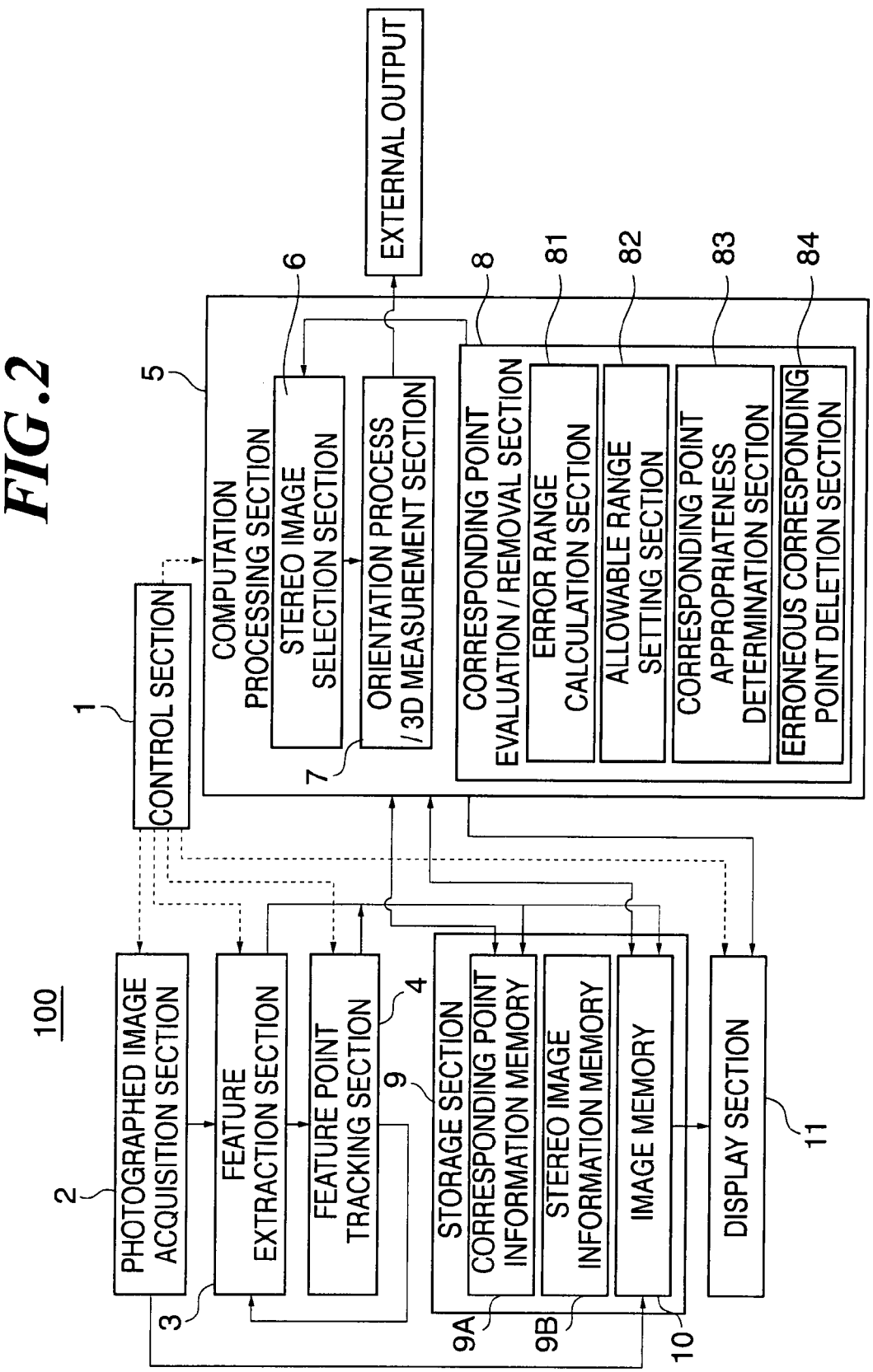
FIG. 2 is a block diagram showing an exemplary configuration of an image processing device in the first embodiment.

FIG. 2 shows an exemplary configuration of an image processing device 100 in this embodiment. In the drawing, reference numeral 1 denotes a control section for controlling respective sections of the image processing device 100 to enable it to function as an image processing device. Specifically, the control section 1 commands a photographed image acquisition section 2 to acquire photographed images, a feature extraction section 3 to extract feature points, a feature point tracking section 4 to perform tracking, a computation processing section 5 to select stereo images, to perform an orientation and a 3D measurement, to perform an evaluation and a deletion of corresponding feature points, etc.

Reference numeral 2 denotes a photographed image acquisition section for sequentially acquiring photographed images that change over time, such as moving images. Besides acquiring photographed images, the photographed image acquisition section 2 sends an output to the feature extraction section 3, saves the photographed images in an image memory 10, etc. Incidentally, the images may not necessarily be acquired with own photographing device, and may be acquired from other photographing devices through communication with them. Reference numeral 3 denotes a feature extraction section for extracting feature points from the sequentially acquired photographed images. The feature extraction section 3 extracts feature points from the photographed images input from the photographed image acquisition section 2, outputs the extracted feature points to the feature point tracking section 4, etc. Reference numeral 4 denotes a feature point tracking section for searching for corresponding points (which should be referred to as "candidate corresponding points" until they are firmly determined, to be exact; in this embodiment, however, they are simply referred to as "corresponding points" too) corresponding to the feature points input from the feature extraction section 3 to keep track of the feature points. Besides the tracking process, the feature point tracking section 4 outputs the tracking results to a corresponding point information memory 9A, judges the arrangement of the corresponding points, commands the feature extraction section 3 to establish new feature points, etc. The series of photographed images for which feature points have been correlated, or to which corresponding feature points have been added, by the feature points tracking section 4 are stored in the image memory 10 as rectified images in which the magnification, sway and tilt have been corrected by a rectification process to be described later, together with the images as originally acquired.

Reference numeral 5 denotes a computation processing section having a stereo image selection section 6, an orientation process/3D measurement section 7 and a corresponding point evaluation/removal section 8. The stereo image selection section 6 selects stereo images from the series of images to which corresponding feature points have been added by the feature extraction section 3 and the feature extraction section 4. The orientation process/3D measurement section 7 perform an orientation calculation and a 3D measurement using the stereo images selected by the stereo image selection section 6. Besides, the orientation process/3D measurement section 7 performs a rectification process, outputs the orientation results and the 3D measurement results to the display section 11 and to the outside, etc. At minimum one pair of stereo images are necessary for an orientation calculation and a 3D measurement. The precision can be improved by a statistical process such as averaging using more pairs of stereo images. The corresponding point evaluation/removal section 8 removes erroneous corresponding points, such as erroneously correlated corresponding points and unstable feature points with movement or sway, that is, feature points and corresponding points inappropriate for 3D measurement, using the 3D measurement results. The corresponding point evaluation/removal section 8 includes an error range calculation section 81, an allowable range setting section 82, a corresponding point appropriateness determination section 83, and an erroneous corresponding point deletion section 84. The error range calculation section 81 calculates the error range of the 3D coordinates of the corresponding feature points obtained from the stereo images in the 3D measurement. The allowable range setting section 82 sets, as the allowable range, an overlapping area of the error ranges of the corresponding feature points in a plurality of photographed images, that is, the range where the positional coordinates of the corresponding feature points are possibly contained. The corresponding point appropriateness determination section 83 determines whether or not the corresponding feature points are appropriate for 3D measurement based on the error range of the 3D coordinates of the corresponding feature points. The erroneous corresponding point deletion section 84 deletes those corresponding feature points determined as inappropriate by the corresponding point appropriateness determination section 83. In this embodiment, the error range calculation section 81 calculates the error range of the 3D coordinates of the corresponding feature points based on the photographing conditions of the photographed images. Also, the corresponding point appropriateness determination section 83 compares the error range with the allowable range for each corresponding feature point, and determines those corresponding feature points with overlap between the error range and the allowable ranges as allowable corresponding points (appropriate corresponding points), and those without overlap therebetween as unallowable corresponding points (inappropriate corresponding points). The stereo image selection section 6 again selects stereo images from the series of images from which inappropriate corresponding feature points have been removed by the corresponding point evaluation/removal section 8. Then, the orientation process/3D measurement section 7 performs another orientation calculation and another 3D measurement using the selected stereo images.

Reference numeral 11 denotes a display section for two-dimensionally or stereoscopically displaying an image of (presenting a stereoscopic two-dimensional display of) the object subjected to an orientation process or a 3D measurement by the computation processing section 5 or the tracks of the photographing position. Reference numeral 9 denotes a storage section including a corresponding point information memory 9A, a stereo image information memory 9B and an image memory 10. The corresponding point information memory 9A stores information of feature points and their corresponding points (including candidate corresponding points). The stereo image information memory 9B stores information of stereo images. The image memory 10 stores photographed images, rectified images and other images. The corresponding point information memory 9A, the stereo image information memory 9B and the image memory 10 are referenced and overwritten as necessary, for example when feature points are tracked, when corresponding points are evaluated/removed, when stereo images are selected, during orientation calculations and 3D measurements, and at other appropriate times.

Figure 3:
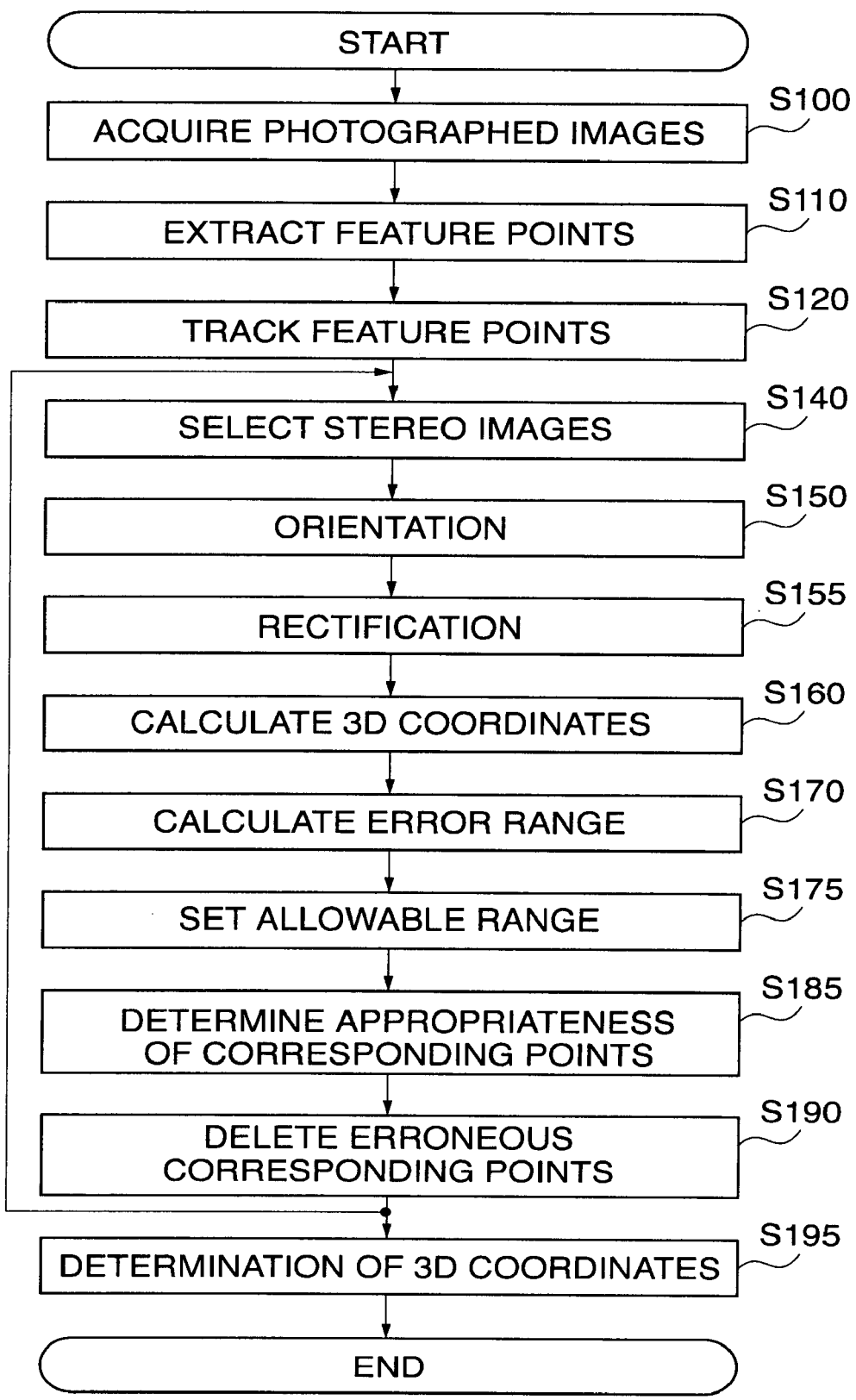
FIG. 3 is an exemplary flowchart of an image processing method in the first embodiment.

FIG. 3 is an exemplary flowchart of an image processing method in the first embodiment. First of all, the photographed image acquisition section 2 acquires a series of photographed images that change over time, such as moving images, of a relatively moving object (S100: photographed image acquisition step). Three or more successive ones of the series of photographed images should have an overlapping area with each other. The photographed image acquisition section 2 may acquire images with its own photographing camera, or may acquire images photographed with other photographing devices via a communication line. The acquired photographed images are accumulated in the image memory 10. The control section 1 sequentially sends the photographed images that change over time, such as moving images, from the photographed image acquisition section 2 to the feature extraction section 3. In this embodiment, a photographing camera is mounted on a car to perform photographing while traveling. Thus, the photographed images change gradually in terms of time or space and hence the photographed objects are generally common in adjacent photographed images. The feature extraction section 3 extracts feature points from any of the photographed images photographed over time (S110: feature extraction step). The data of the extracted feature points are sent to the feature point tracking section 4 and stored in the corresponding point information memory 9A.

With three or more images having an overlapping area with each other, it is possible to keep track of the feature points. The feature point tracking section 4 searches for corresponding points corresponding to the feature points for the series of photographed images, correlates them, and tracks the feature points (S120: feature point tracking step). The feature points are tracked sequentially as follows. For a feature point in a first image, a corresponding point is searched for in a second image, and when found, correlated to the feature point in the first image; then for the corresponding point in the second image now as a new feature point, a corresponding point is searched for in a third image, and when found, correlated to the feature point in the second image; etc. Here, feature points in a series of photographed images that are correlated with each other are referred to as "corresponding feature points". The data of the corresponding feature points are stored in the corresponding point information memory 9A, and the tracking results are also stored as history information. The tracking information for each corresponding point is accumulated in the corresponding point information memory 9A, and a candidate corresponding point list is prepared in the corresponding point information memory 9A. That is, the candidate corresponding point list stores the coordinates of each corresponding feature point on a 2D screen for each photographed image. After 3D coordinate measurement, 3D coordinates are also stored. The determination results as to whether or not appropriate as a corresponding feature point are also stored. The photographed images to which corresponding feature points have been added are rectified, and stored in the image memory 10 as rectified images in which the magnification, sway and tilt have been corrected and from which vertical parallax has been eliminated, along with the images as originally acquired (S125). If the data of the feature points extracted by the feature extraction section 3 and the data of the corresponding feature points correlated by the feature point tracking section 4 are sequentially sent to the computation processing section 5 in real time, it is highly likely that an orientation process and a 3D measurement can be performed early in the moving body (such as a car) in motion so that the results can be reflected to a navigator.

Then, stereo images are selected from the series of photographed images to which corresponding feature points have been added (S140: stereo image selection step). The series of images are preferably rectified images in which the magnification, sway and tilt have been corrected and from which vertical parallax has been eliminated by reflecting the tracking process, but also may be selected from the images as originally acquired as they can be correlated with each other in the following orientation process and 3D measurement. Stereo images can be selected from various candidate combinations of images. A stereo pair candidate list storing information of selected combinations as candidates for stereo images is prepared in the stereo image information memory 9B. The stereo pair candidate list stores the numbers of the photographed images constituting stereo pairs, the focal length and the photographing direction of each photographed image, the baseline length of each pair possibly formed, and after a rectification process, the numbers of the rectified images, and after a 3D measurement of coordinates, the photographing distance. The error range calculated by the error range calculation section is also stored, thus allowing for preparation of error range data representing the correspondence between the stereo images and the error range. Thus, the stereo image selection section references the stereo pair candidate list to select appropriate stereo images.

Figure 4:
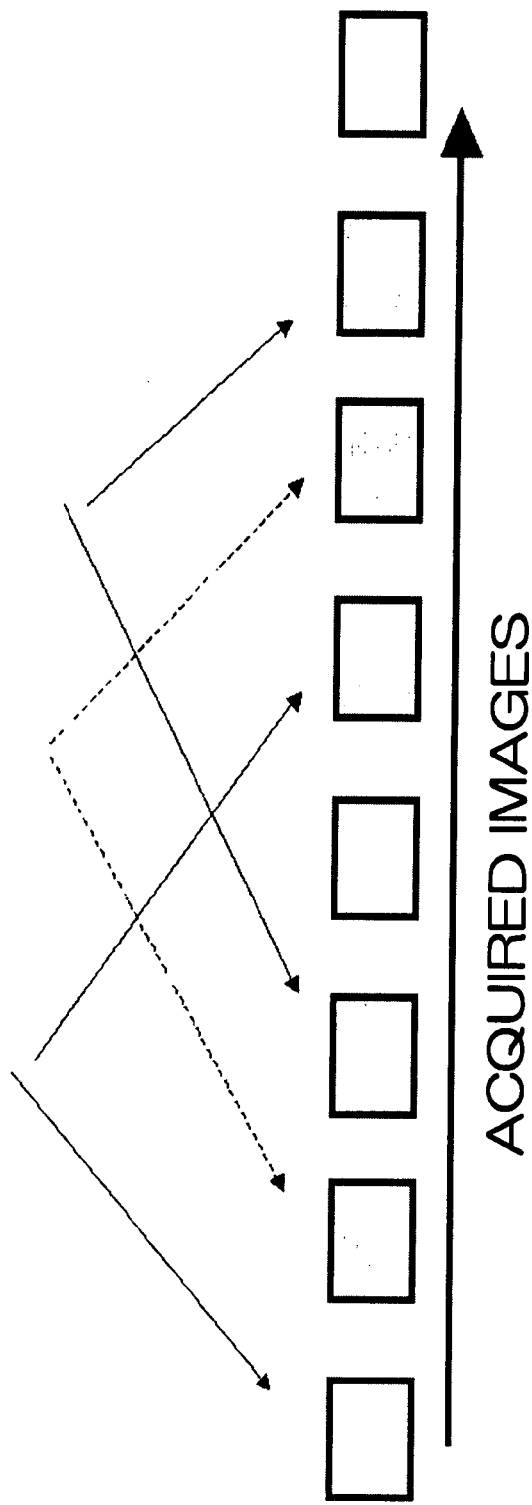
FIG. 4 shows an example of selecting stereo images.

FIG. 4 shows an example of selecting stereo images. In this example, an acquired image and an image several frames away therefrom are selected as stereo images. It is preferable to select pairs of images with the same intervals between the frames, because in this way the baseline lengths are kept approximately constant. At minimum one pair of stereo images need to be selected. The precision can be improved by a statistical process, such as averaging, using more pairs of stereo images. Here, a large number of stereo images are selected from a large number of photographed images subjected to tracking, and subjected to such a statistical process.

Returning to FIG. 3, the orientation process/3D measurement section 7 performs an orientation process and a 3D measurement using the corresponding feature points of the stereo images selected by the stereo image selection section 6. The orientation process uses the coordinates of the feature points and the corresponding points for the selected stereo images to determine the relative orientation, so as to calculate the photographing position and tilt of the photographing camera (S150: first orientation step). A connection orientation for the stereo images is also performed. For the photographed images where a pair of stereo images cannot be set, a single photograph orientation can be performed to calculate the photographing position and tilt of the photographing camera. Subsequent to the relative orientation process, the orientation process/3D measurement section 7 performs a rectification process (S155: rectification step).

Figure 5:
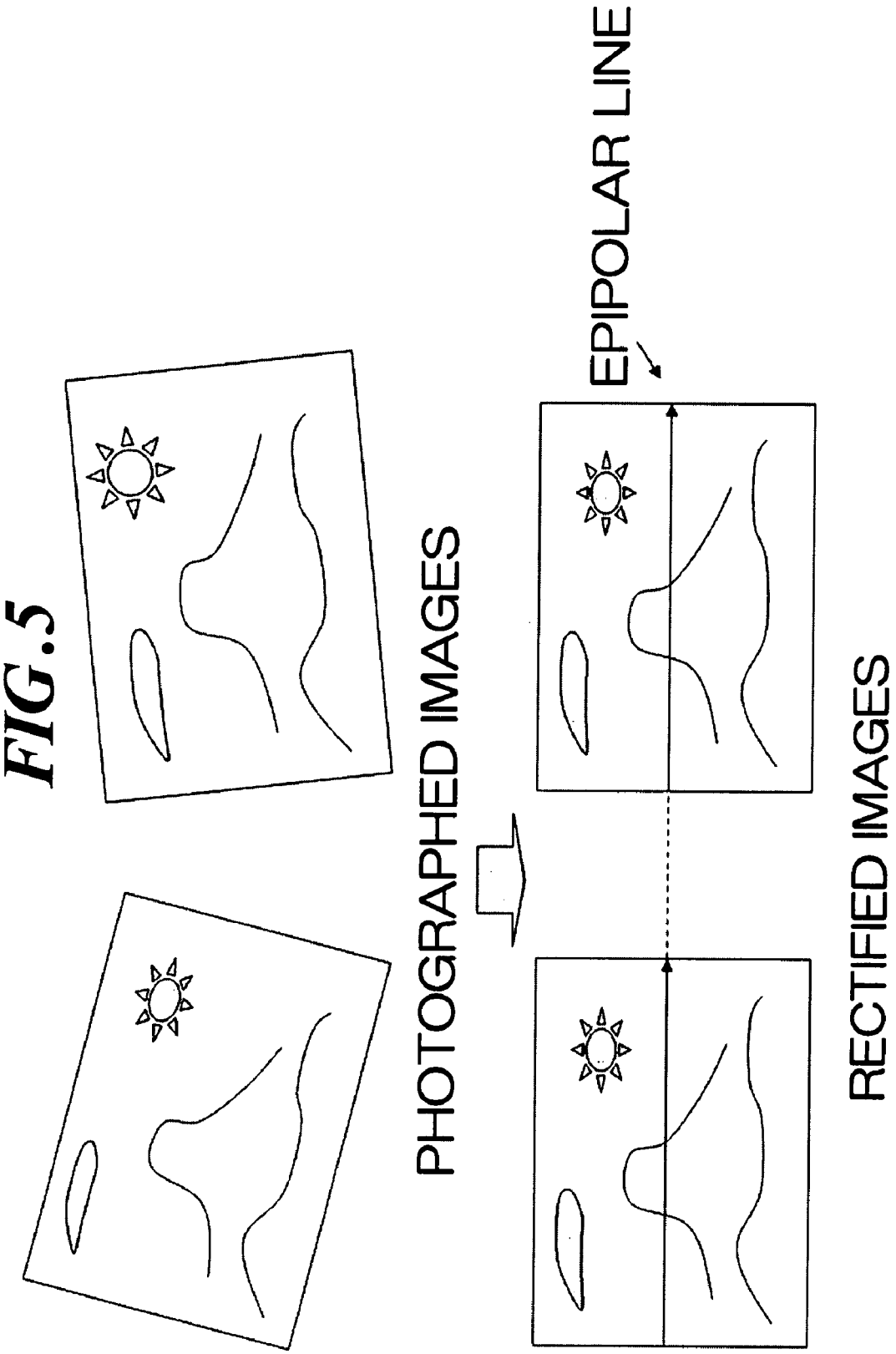
FIG. 5 is a diagram for explaining a rectification process.

FIG. 5 is a diagram for explaining a rectification process. In the rectification process, the photographed images are corrected using the photographing position and tilt of the photographing device obtained in the orientation process such that the images will be in parallel to the subject and that the epipolar lines of the left and right images will be on a horizontal line, so that the photographed images will satisfy the geometry for a stereo method with respect to the measurement object. Thus, the magnification and distortion in tilt, etc., of the left and right images are corrected, so that the images have the same magnification and vertical position.

The description will refer to FIG. 3 again. A 3D measurement is performed using the orientation results and the rectified image data to calculate the 3D coordinates of the respective feature points (S160: first 3D measurement step). The 3D measurement can be easily performed based on the principle of a stereo method shown in FIG. 9 and described later, using the equations (5) to (7). Alternatively, the 3D measurement can be implemented by performing a bundle adjustment, using the position and tilt of the photographing camera (exterior orientation elements) obtained in the orientation process as initial values, for example. In this way, not only the 3D coordinates but also more accurate position and tilt of the photographing camera can be obtained.

Then, the corresponding point evaluation/removal section 8 removes erroneous corresponding points, such as erroneously correlated corresponding points and unstable feature points with movement or sway, using the 3D measurement results.

First of all, the error range calculation section 81 calculates the error range for every stereo images set based on the photographing conditions of the photographed images with respect to the 3D coordinates of the corresponding feature points in each stereo image obtained in the 3D measurement step (S170: error range calculation step). The error range is determined based on the photographing distance H, the photographing baseline length B, the focal length f and the pixel resolution $\Delta p$. Then, the allowable range setting section 82 sets an overlapping area of the error ranges obtained for the corresponding feature points in a plurality of different stereo images as the allowable range (S175: allowable range setting step). Then, the corresponding point appropriateness determination section 83 determines whether or not each corresponding feature point is appropriate based on whether or not the error range of that corresponding feature point has an overlapping area with the allowable range set by the allowable range setting section 82 (S185: corresponding point appropriateness determination step). That is, those corresponding feature points having an overlapping area are determined as allowable corresponding points, and those not having an overlapping area as unallowable corresponding points. Then, the erroneous corresponding point deletion section 84 deletes the corresponding feature points determined as inappropriate by the corresponding point appropriateness determination section 83 (S190: erroneous corresponding point deletion step).

Now, returning to the stereo image selection step (S140), stereo images are selected using those corresponding feature points excluding the erroneous corresponding points deleted by the erroneous corresponding point deletion section 8 (S140), and another orientation is performed (S150: second orientation step). Then, a rectification process is performed using the orientation results (S155: second rectification step), and another 3D measurement is performed (S160: second 3D measurement step). Because the second orientation step, the second rectification step and the second 3D measurement step are performed after removal of the erroneous corresponding points, that is, the inappropriate corresponding feature points detected, more precise orientation results and hence 3D coordinates can be obtained. By repeating this loop of processes (S140 to S190), the measurement precision can be improved. The loop of processes is repeated until no more corresponding feature points are determined as inappropriate. When the conditions necessary for establishing 3D coordinates are satisfied, the 3D coordinates are established (S195), and the measurement is ended.

The respective steps are described below as necessary.

[Characteristic Point Extraction]

Figure 6:
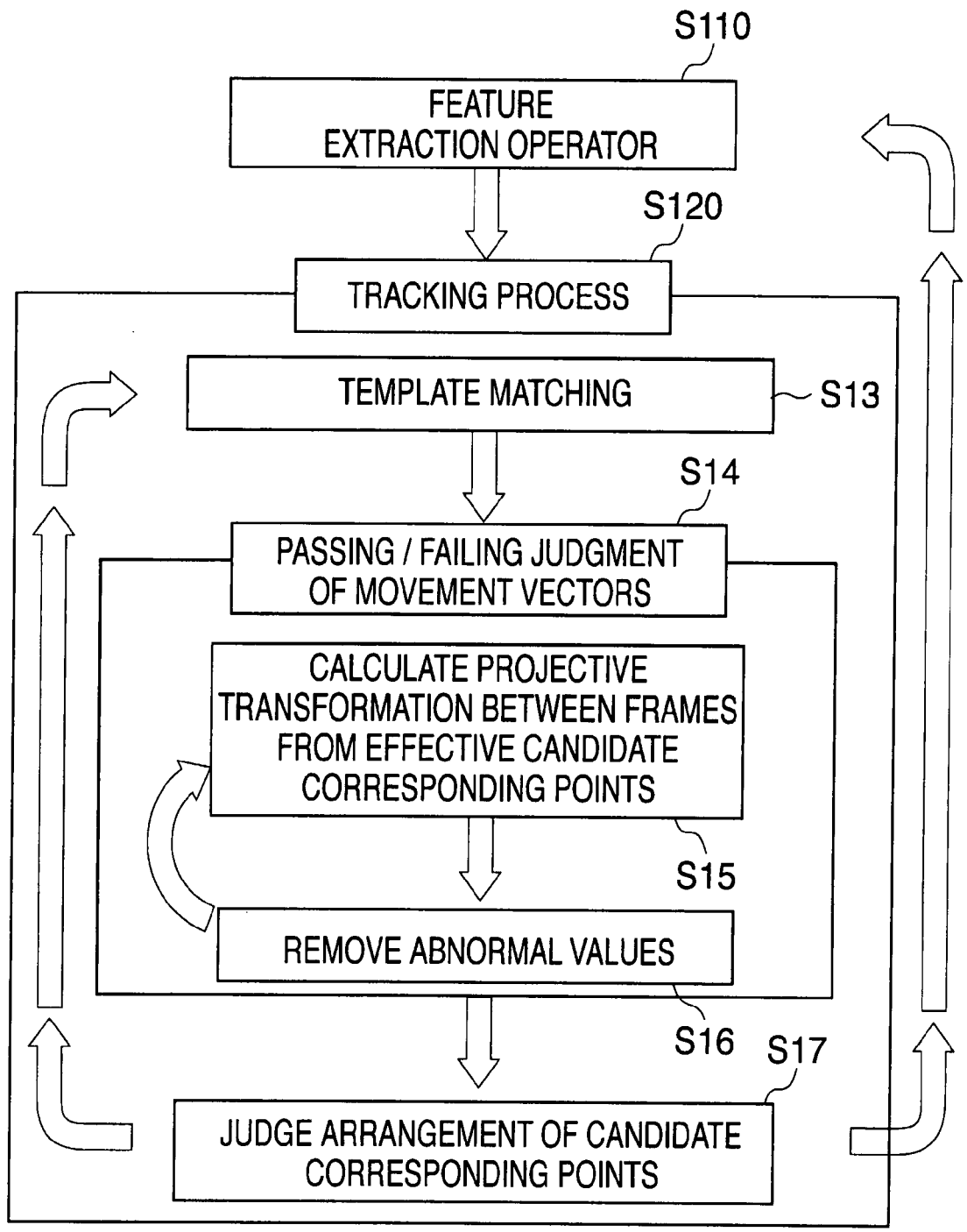
FIG. 6 is an exemplary flowchart of tracking feature points.

The feature extraction section 3 extracts feature points from each photographed image (S110; see FIG. 6). Typically, feature points are extracted from the entire screen in the initial frame, and from an area of the screen which does not overlap with that in the initial frame in subsequent frames. The extraction of feature points in the initial frame may appropriately employ, for example, a MORAVEC operator (H. P. Moravec. Towards Automatic Visual Obstacle Avoidance. Proc. 5th International Joint Conference on Artificial Intelligence, pp. 584, 1977.), or other operators such as Hariss, Pressy and Susan.

[Tracking Process]

FIG. 6 is an exemplary flowchart of tracking feature points. The feature point tracking section 4 performs a tracking process for each feature point selected in the feature extraction process (S120). That is, the feature point tracking section 4 obtains candidate corresponding points corresponding to the feature points, obtains the movement vectors of the feature points and the screen relative movement amount, and in addition, links these to obtain the movement tracks. The term "screen relative movement amount" refers to the amount of relative movement on the screen between the photographing camera and the object to be photographed. The term "movement vectors" refers to vectors of relative movement of respective feature points on 2D photographed images. Before tracking the feature points, first, a template matching is performed for successive adjacent photographed images (S13) to obtain candidate corresponding points corresponding to the feature points. In this way, the movement vectors of the respective feature points can be obtained. By using successive adjacent photographed images to perform a projective transformation (S15), the screen relative movement amount relative to the photographing camera can be obtained. On the assumption that the time interval between frames is significantly short and hence the overall movement between frames can be generally approximated by a projective transformation, a projective transformation is performed to estimate the screen relative movement amount. Then, the movement vectors of the respective feature points are compared with the screen relative movement amount between frames to judge whether the movement vectors are passing or failing (S14). Then, candidate corresponding points that show abnormal movement and hence can be considered as erroneous corresponding points are removed (S16). Repeating the steps S15 and S16 improves the precision of the projective transformation.

Next, a judgment is made as to the arrangement of the candidate corresponding points (S17). That is, the arrangement of the feature points and the corresponding points on the photographed images is checked. In the case where the arrangement of the feature points is so deviated as to create a vacant area, the feature extraction section 3 is commanded to establish new feature points in the vacant area. Then, the process returns to the feature extraction (S110) to repeat the feature extraction (S110) and the tracking process (S120) sequentially for new successive images in real time. If the feature extraction has been finished for the series of photographed images, the process returns to the template matching (S13) to posteriorly and collectively perform the tracking process (S120) sequentially for new successive images.

To keep track of the feature points, the template matching is used, for example (S13). Successive images are sequentially selected as stereo pairs from the acquired photographed images. The selected images are subjected to a stereo matching, for example an SSDA (Sequential Similarity Detection Algorithm) method, to obtain corresponding points (S13). The SSDA method determines the degree of similarity using a residual. By the SSDA method, the position where the residual of a part of a matrix is minimum is obtained as a corresponding point. The SSDA template matching is relatively fast among other template matching schemes, and considered easily adaptable to hardware processing. Other schemes such as a normalized correlation method may be employed. In the template matching, it is important to select optimum template size and search range. An optimum search range can be set based on the frame rate of the video camera, the traveling speed, etc.

Erroneous corresponding points can be created in the case where feature points are added to a moving object, in a photographed screen, such as a running car, a person, a flying bird or a falling leaf, or in the case where the camera sways drastically. The camera sway can be corrected through the projective transformation. On the other hand, an object that moves differently from the object to be photographed can create erroneous corresponding points. Thus, removing erroneous corresponding points that were created by the movement of such an object can improve the reliability of the feature points (which include corresponding points and candidate corresponding points) and the precision in the determination of mismatching, thereby coping with even significant sway of the video camera.

[Orientation Process/3D Measurement]

The orientation process/3D measurement section 7 performs a relative orientation, a rectification process and a 3D measurement. For respective images selected as a stereo pair, an orientation calculation process is performed using the coordinates of the feature points and the corresponding points. The position and tilt of the camera that photographed the images can be obtained through the orientation calculation process. Then, the 3D position of the corresponding points can be obtained. In the orientation calculation process, the relative orientation is used to correlate the photographed images selected as a stereo pair, while a connection orientation or a bundle adjustment is performed with respect to the orientation between a plurality or all of the images. In order to select such a stereo pair, the orientation process/3D measurement section can select a pair of images estimated to have suitable baseline lengths, from a plurality of images acquired with the photographed image acquisition section, thereby enabling suitable orientation process and 3D measurement.

[Relative Orientation Process]

Next, an orientation calculation is described. The position, tilt, etc., of the left and right cameras that photographed the images can be obtained through this calculation.

Figure 7:
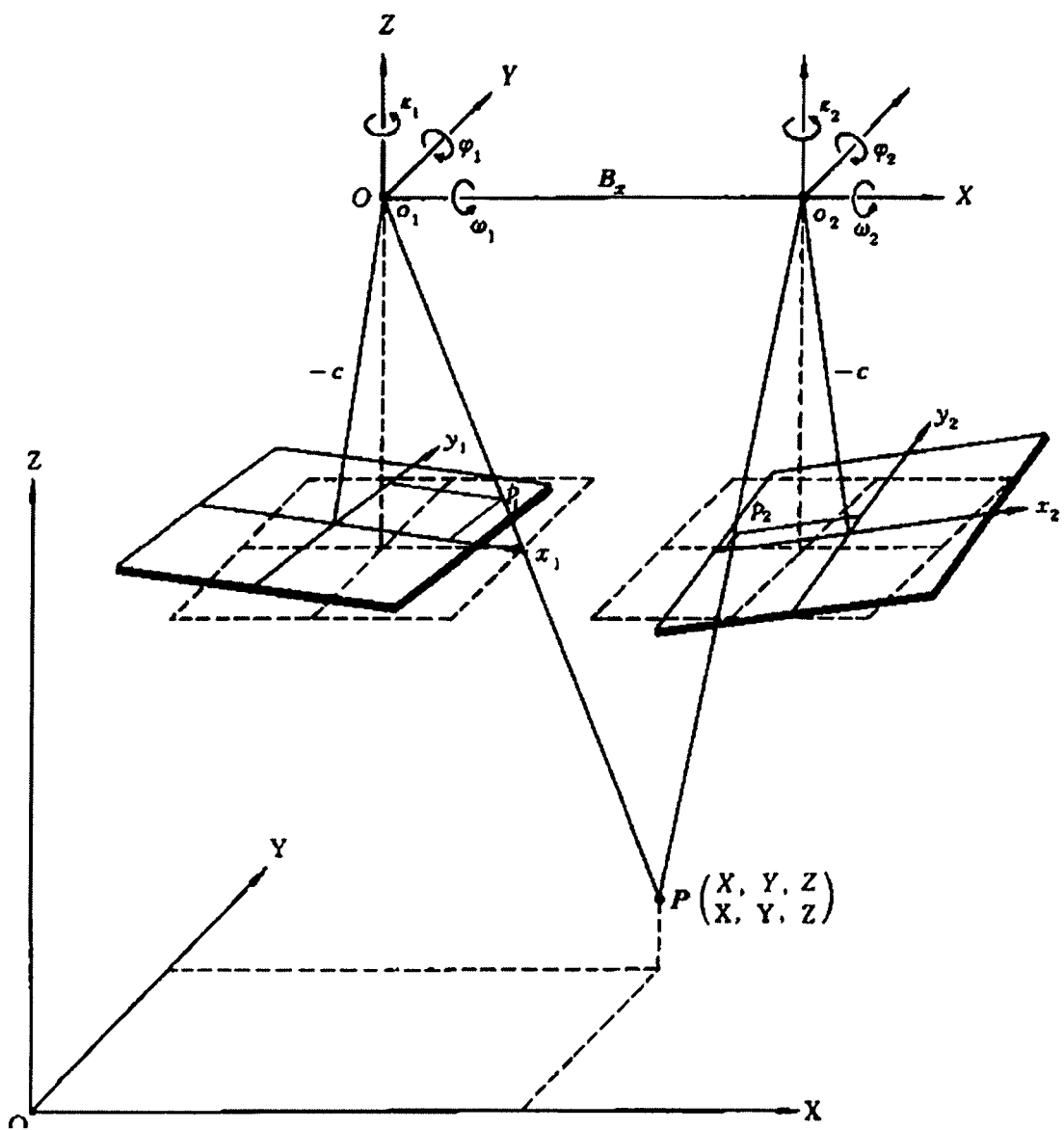
FIG. 7 is a diagram for explaining a relative orientation.

FIG. 7 is a diagram for explaining a relative orientation. The origin of a model coordinate system is located at the left projection center, and the line connecting it and the right projection center is used as the X-axis. As for the reduction scale, the baseline length is used as the unit length. Parameters to be obtained are five rotational angles, namely Z-axis rotational angle $\kappa_1$ and Y-axis rotational angle $\phi_1$ of the left camera, and Z-axis rotational angle $\kappa_2$, Y-axis rotational angle $\phi_2$ and X-axis rotational angle $\omega_2$ of the right camera. In this case, X-axis rotational angle $\omega_1$ of the left camera is 0 and thus need not be considered.

First of all, the parameters required to decide the positions of the left and right cameras are obtained from the coplanarity condition equation (1) below: The screen distance C is equivalent to the focal length f.

$$\begin{bmatrix} X_{01} & Y_{01} & Z_{01} & 1 \\ X_{02} & Y_{02} & Z_{02} & 1 \\ X_1 & Y_1 & Z_1 & 1 \\ X_2 & Y_2 & Z_2 & 1 \end{bmatrix} = C \quad (1)$$

$X_{01}, Y_{01}, Z_{01}$: projection center coordinates of left image
$X_{02}, Y_{02}, Z_{02}$: projection center coordinates of right image
$X_1, Y_1, Z_1$: image coordinates of left image
$X_2, Y_2, Z_2$: image coordinates of right image Under the above conditions, the coplanarity condition equation (1) can be transformed into the equation (2), and the respective parameters can be obtained by solving the equation (2):

$$F(\kappa_1, \phi_1, \kappa_2, \phi_2, \omega_2) = \begin{vmatrix} Y_1 & Z_1 \\ Y_2 & Z_2 \end{vmatrix} = Y_1 Z_2 - Y_2 Z_1 = 0 \quad (2)$$

Here, such coordinate transformation relations (3) and (4) as given below hold between the model coordinate system XYZ and the camera coordinate system xyz:

$$\begin{pmatrix} X_1 \\ Y_1 \\ Z_1 \end{pmatrix} = \begin{pmatrix} \cos\phi_1 & 0 & \sin\phi_1 \\ 0 & 1 & 0 \\ -\sin\phi_1 & 0 & \cos\phi_1 \end{pmatrix} \begin{pmatrix} \cos\kappa_1 & -\sin\kappa_1 & 0 \\ \sin\kappa_1 & \cos\kappa_1 & 0 \\ 0 & 0 & 1 \end{pmatrix} \begin{pmatrix} x_1 \\ y_1 \\ -c \end{pmatrix} \quad (3)$$

$$\begin{pmatrix} X_2 \\ Y_2 \\ Z_2 \end{pmatrix} = \begin{pmatrix} 1 & 0 & 0 \\ 0 & \cos\omega_2 & -\sin\omega_2 \\ 0 & \sin\omega_2 & \cos\omega_2 \end{pmatrix} \begin{pmatrix} \cos\phi_2 & 0 & \sin\phi_2 \\ 0 & 1 & 0 \\ -\sin\phi_2 & 0 & \cos\phi_2 \end{pmatrix} \begin{pmatrix} \cos\kappa_2 & -\sin\kappa_2 & 0 \\ \sin\kappa_2 & \cos\kappa_2 & 0 \\ 0 & 0 & 1 \end{pmatrix} \begin{pmatrix} x_2 \\ y_2 \\ -c \end{pmatrix} + \begin{pmatrix} 1 \\ 0 \\ 0 \end{pmatrix} \quad (4)$$

Using these equations, unknown parameters are calculated by the following procedures:

(i) Initial approximate values of the parameters ($\kappa_1$, $\phi_1$, $\kappa_2$, $\phi_2$, $\omega_2$) are normally 0.

(ii) A derivative coefficient obtained when the coplanarity condition equation (2) is linearized, or Taylor-expanded, around the approximation is obtained from the equations (3) and (4), to formulate an observation equation.

(iii) A least squares method is applied to calculate correction amounts for the approximate values.

(iv) The approximate values are corrected.

(v) Using the corrected approximate values, the operations (ii) to (v) are repeated until a convergence is achieved.

If a convergence is achieved, a connection orientation is performed in addition. This process standardizes the tilts and reduction scales of respective models to be represented in an identical coordinate system.

To perform this process, connection differentials represented by the following equations are calculated:

$\Delta X_j = (X_{jr} - X_{j1})/(Z_0 - Z_{j1})$ $\Delta Y_j = (Y_{jr} - Y_{j1})/(Z_0 - Z_{j1})$ $\Delta Z_j = (Z_{jr} - Z_{j1})/(Z_0 - Z_{j1})$ $\Delta D_j = \sqrt{(\Delta X_{j2} + \Delta Y_{j2})}$ $(\Delta X_{j1}, \Delta Y_{j1}, \Delta Z_{j1})$: j-th left model in standardized coordinate system
$(\Delta X_{jr}, \Delta Y_{jr}, \Delta Z_{jr})$: j-th right model in standardized coordinate system If $\Delta Z_j$ and $\Delta D_j$ are 0.0005 (1/2000) or less, the connection orientation is considered to have been performed properly. If it was not performed properly, orientation results with an error indication are output to show which part of the image is not suitable. In this case, other orientation points on the image, if any, are selected to repeat the above calculations (ii) to (v). If it does not work, the arrangement of the orientation points is changed.

[Rectification Process]

In the rectification process, the images are rectified such that the epipolar lines of the left and right images will be coincided with each other on a horizontal line, so as to be transformed into images to which a stereo method can be applied. Also, a 3D measurement is performed using image data obtained in the orientation process and the rectification process.

Figure 8:
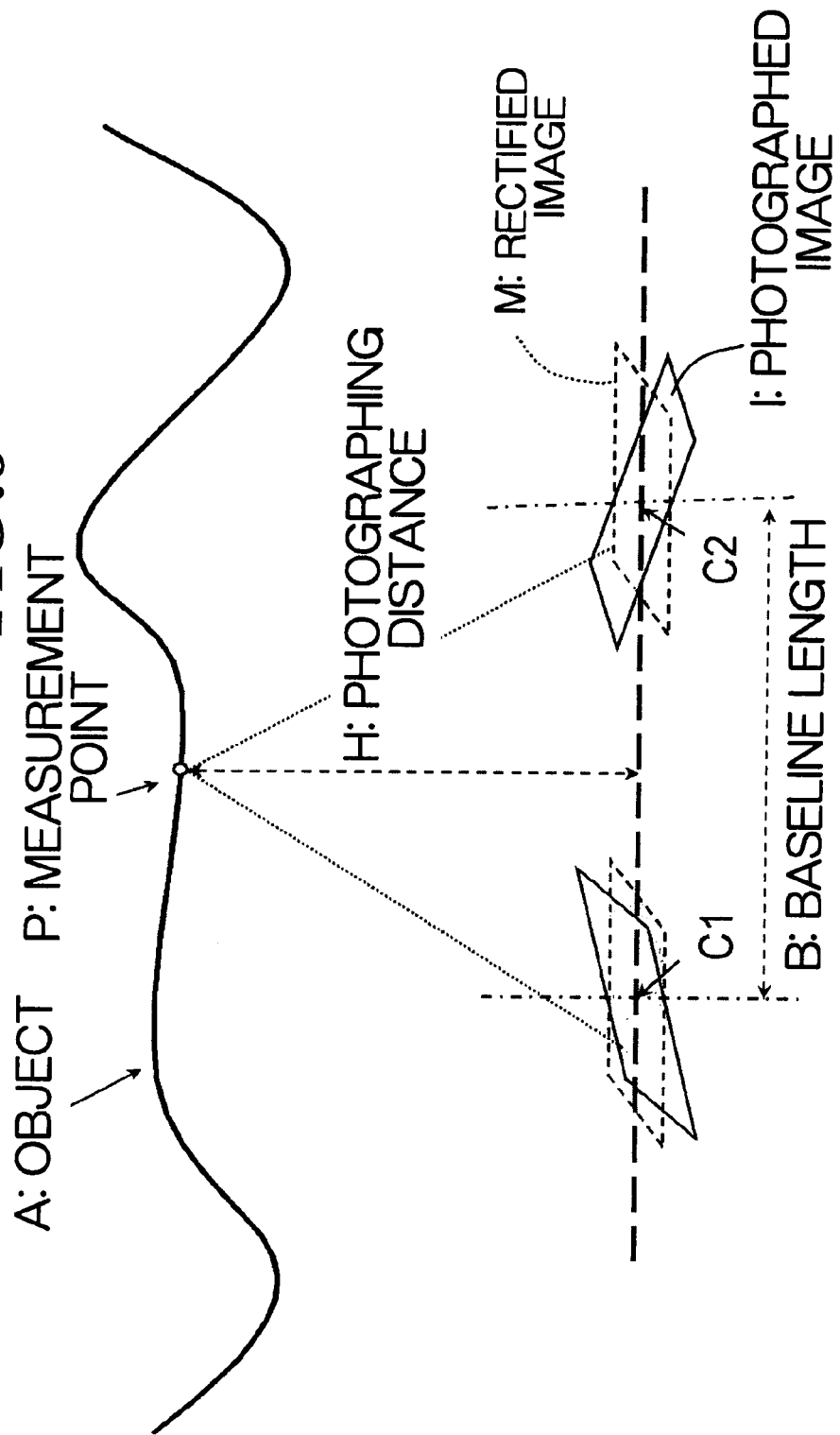
FIG. 8 is a diagram showing the relationship between the 3D coordinate position of a corresponding feature point and the position of a camera.

FIG. 8 shows the relationship between the 3D coordinate position of a corresponding feature point and the position of a camera. Stereo cameras C1 and C2 photographs a measurement point P on an object A in stereo (the camera positions are indicated by C1 and C2 in FIG. 8). Photographed images (original image) I are acquired with the tilt and sway in position of the camera reflected. However, rectified images M have aligned epipolar lines with the tilt and sway in position of the camera rectified, and thus are suitable for distance measurement. The baseline length B of the cameras can be easily obtained by calculation using two photographing positions obtained in the relative orientation process. The photographing distance H can be obtained based on the 3D coordinate positions of the corresponding feature points calculated in the 3D measurement and the camera positions.

[Stereo Method]

Now, the 3D coordinates of each feature point (candidate corresponding point) are calculated. The 3D coordinates are calculated by a stereo method, for example.

Figure 9:
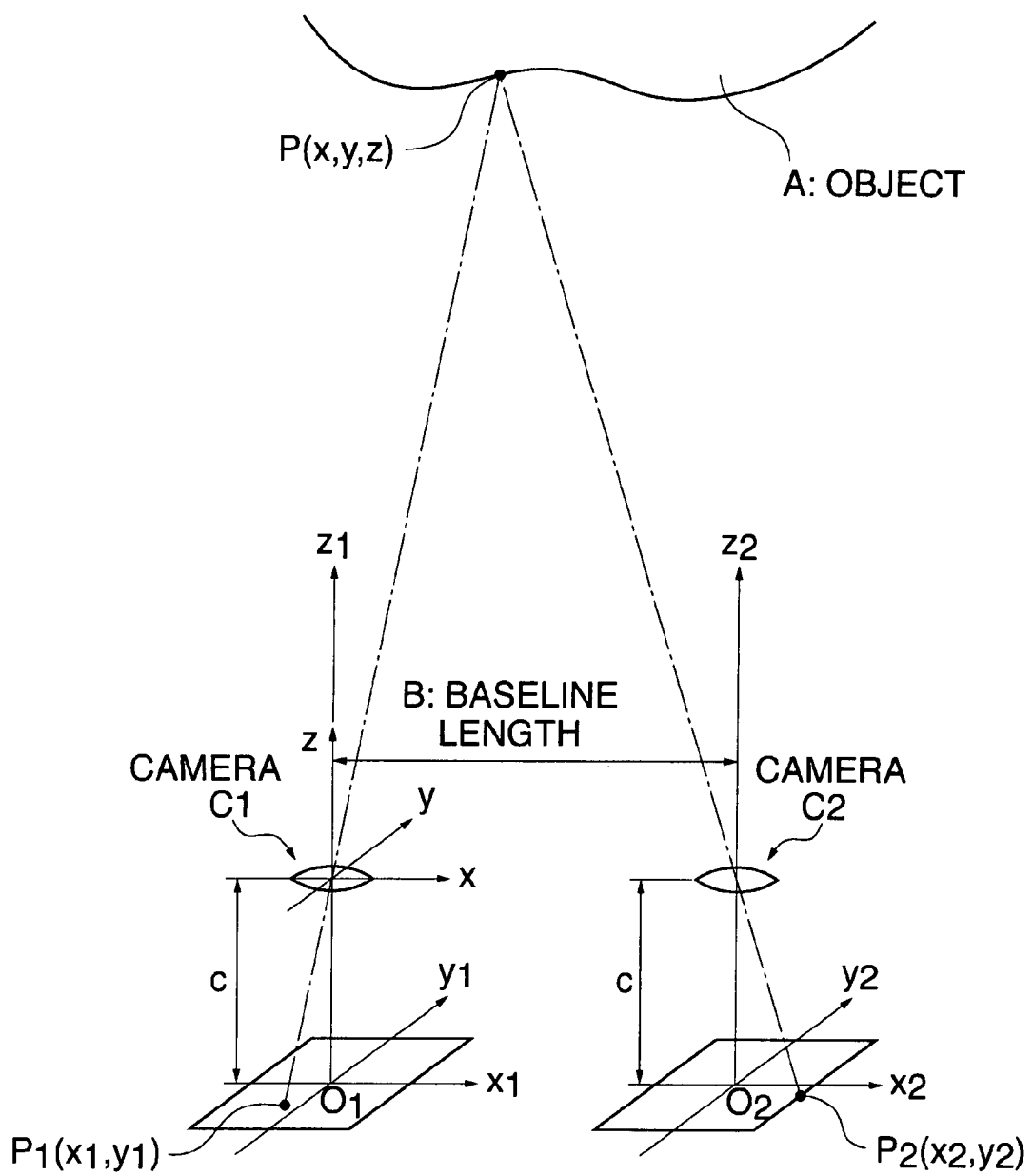
FIG. 9 is a diagram for explaining a stereo method.

FIG. 9 is a diagram for explaining a stereo method. For simplicity, it is assumed that two cameras C1 and C2 of the same specifications are used. The optical axes of the cameras C1 and C2 are parallel to each other, the distances "c" from the principal point of the camera lens to the CCD surface are the same, and the CCDs are disposed perpendicular to the optical axes. The distance between the optical axes of the two cameras C1 and C2 (baseline length) is represented as "B".

The coordinates of a point P1 (x1, y1) and a point P2 (x2, y2) on the CCD surface formed from a point P (x, y, z) on an object have the following relationship.

$x1 = cx/z$ \quad (5)

$y1 = y2 = cy/z$ \quad (6)

$x2 - x1 = cB/z$ \quad (7)

Note that the origin of the entire coordinate system (x, y, z) is located at the principal point of the lens of the camera C1.

"z" can be obtained from the equation (7), and "x" and "y" can then be obtained using the "z" from the equations (5) and (6).

As can be understood from the explanation of the stereo method, if the photographing distances (magnifications), directions and baseline length B of the cameras C1 and C2 change, this principle becomes less likely to hold and as a result it becomes more difficult to obtain solutions with stable precision.

Equations for obtaining one pixel resolution in the stereo method are given below.

In the case where two photographed images are used for measurement, the theoretical resolution for one pixel can normally be obtained from the following equations.

$$\text{In-plane resolution: } \Delta xy = H \times \Delta p / f \quad (8)$$

$$\text{Depth resolution: } \Delta z = H \times H \times \Delta p / (B \times f) \quad (9)$$

The error range ($\sigma_{xy}$, $\sigma_z$) is represented as $\sigma_{xy}=k1\Delta xy$, $\sigma_z=k2\Delta z$.

Here, "H" represents photographing distance, "$\Delta p$" represents pixel resolution, "f" represents focal length, "B" represents baseline length, and "k1" and "k2" are coefficients. k1 and k2 are typically 1. k1 and k2 may be smaller than 1 in the case where the photographing distance H is shorter than the preliminarily assumed photographing distance (standard photographing distance) and the precision can be increased, and may be larger than 1, for example 2, 3, etc., in the case where the photographing distance H is longer than the standard photographing distance and the precision should be decreased.

Also from these equations, it can be understood that the photographing distance H and the baseline length B are important parameters for one pixel resolution.

In actual orientations and 3D measurements, one pixel resolution can be calculated properly using all these parameters, such as the photographing distance, baseline length and photographing direction, for corrections and adjustments.

From a viewpoint of obtaining stable and precise solutions, however, the use of these parameters with different values for stereo images might be a factor of solutions with unstable precision because of the basic principle. Thus, when stereo images are to be selected, images with approximately the same photographing distance, magnification and camera direction (parameters of which can be obtained from the photographing position of the camera) are selected.

[Evaluation/Removal of Corresponding Points]

Then, the corresponding point evaluation/removal section 8 removes erroneous corresponding points, such as erroneously correlated corresponding points and unstable feature points with movement or sway, using the 3D measurement results.

Figure 10:
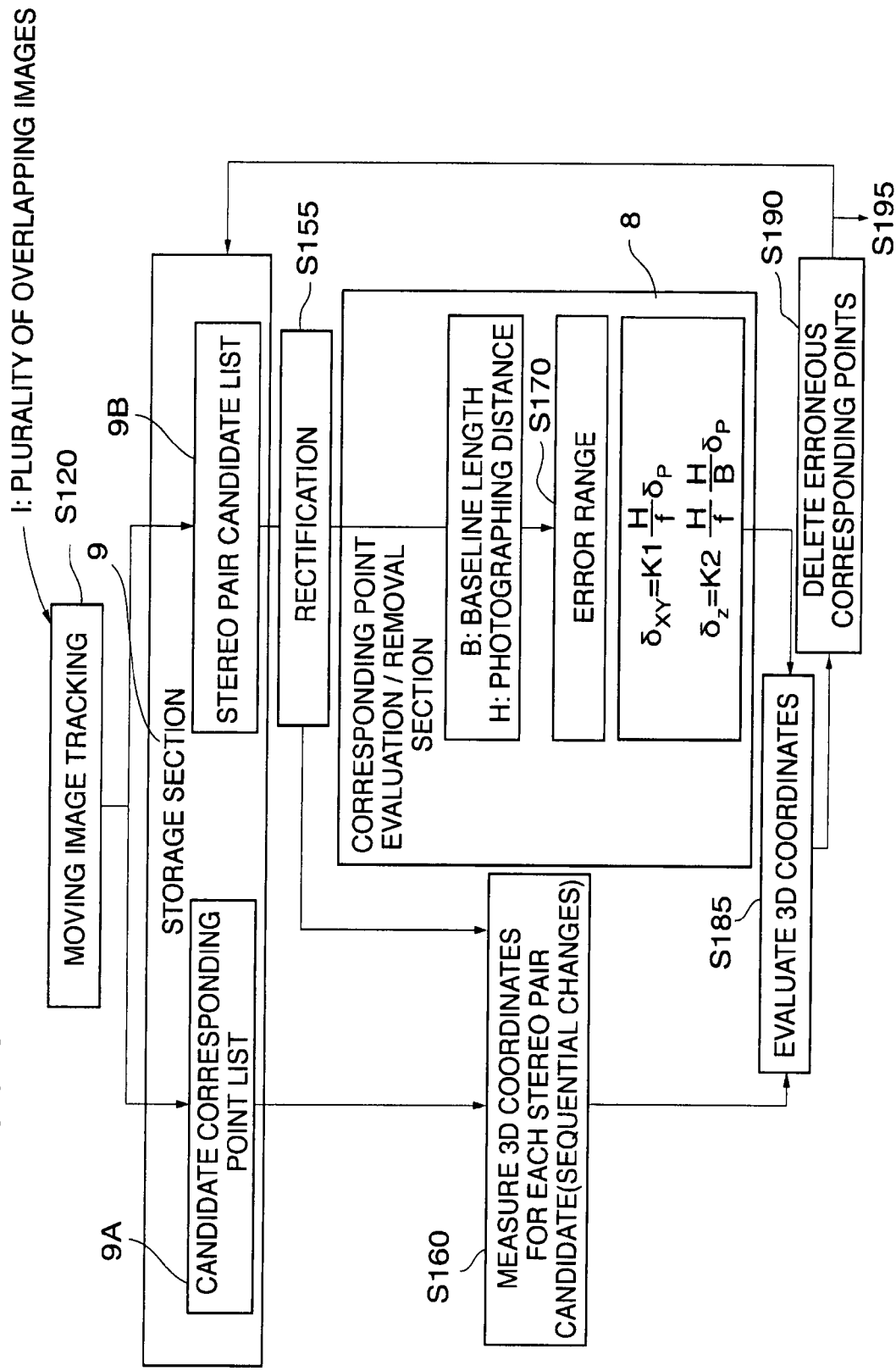
FIG. 10 is an exemplary process flow of removing erroneous corresponding points in the first embodiment.

FIG. 10 schematically shows an exemplary flow of removing erroneous corresponding points. Here, description is made while appropriately referring to FIG. 3. The photographed image acquisition section 2 acquires a plurality of photographed images having an overlapping area with each other (S100). The acquired photographed images are stored in the image memory 10. Characteristic points are extracted from the acquired photographed images (S110), and the feature points are tracked and correlated to each other (S120). The tracking information of each corresponding feature point is accumulated in the corresponding point information memory 9A, and a candidate corresponding point list is prepared in the corresponding point information memory 9A. Stereo images can be selected from the acquired photographed images. A stereo pair candidate list storing information of selected combinations of images as candidates for stereo images is prepared in the stereo image information memory 9B. The error range calculated by the error range calculation section 8 is also stored, thus allowing for preparation of error range data representing the correspondence between the stereo images and the error range. Thus, the stereo image selection section references the stereo pair candidate list to select appropriate stereo images.

The selected stereo images are subjected to a rectification process (S155). Then, using the rectified images subjected to the rectification process, a 3D measurement is performed on the selected stereo images to obtain the 3D coordinates of each corresponding feature point. By performing a 3D measurement of each corresponding feature point in a plurality of stereo images (S160), sequential changes of each corresponding feature point can be obtained. Meanwhile, the stereo pair candidate list is referenced to obtain the baseline length B and the photographing distance H.

The error range calculation section 81 calculates the error range of the 3D coordinates of the corresponding feature points in the stereo images obtained in the 3D measurement step, based on the photographing conditions of the photographed images and for each stereo image (S170: error range calculation step). The error range is determined based on the photographing distance H, the photographing baseline length B, the focal length f and the pixel resolution $\Delta p$. The theoretical resolution precision per pixel is calculated by the equations (8) and (9) (same as given above):

$$\text{In-plane resolution: } \Delta xy = H \times \Delta p / f \quad (8)$$

$$\text{Depth resolution: } \Delta z = H \times H \times \Delta p / (B \times f) \quad (9)$$

where "H" represents photographing distance, "$\Delta p$" represents pixel resolution, "f" represents screen distance, and "B" represents photographing baseline length, and where the focal length f of the cameras and the pixel resolution $\Delta p$ are known.

In this way, the error range E ($\sigma_{xy}=k1\Delta xy$, $\sigma_z=k2\Delta z$) can be obtained.

Then, it is determined whether or not the corresponding feature points are appropriate for 3D measurement based on the error range of the 3D coordinates of the corresponding feature points calculated by the error range calculation section 81. By setting the error range of the 3D coordinates of each corresponding feature point and keeping track of sequential changes thereof, it is possible to determine whether or not each corresponding feature point is a corresponding point appropriate for 3D measurement, that is, whether it is a feature point of the object itself or an erroneous corresponding point. In this embodiment, the allowable range setting section 82 sets an overlapping area of the error ranges in the plurality of different stereo images as the allowable range of the corresponding feature points (S175: allowable range setting step). When setting the allowable range, it is possible to set, as the allowable range, an overlapping area of the error ranges in a predetermined percentage or more of the stereo images or an overlapping area of the error ranges in a predetermined number or more of the stereo images. For example, an overlapping area of the error ranges in 80 percent of the stereo images (16 images, in the case of 20 stereo images having corresponding feature points) may be set as the allowable range, or an overlapping area of the error ranges in 15 images or more may be set as the allowable range, irrespective of the percentage of the images to the population.

Then, the corresponding point appropriateness determination section 83 determines whether each corresponding feature point is an allowable corresponding point or an unallowable corresponding point based on the allowable range set by the allowable range setting section 82 (S185: corresponding point appropriateness determination step). Then, the erroneous corresponding point deletion section 84 deletes the corresponding feature points determined as inappropriate by the corresponding point appropriateness determination section 83 (S190: erroneous corresponding point deletion step).

Now, returning to the stereo image selection step (S140), stereo images are selected using those corresponding feature points excluding the erroneous corresponding points deleted by the erroneous corresponding point deletion section 8 (S140), and another orientation is performed (S150: second orientation step). Then, a rectification process is performed using the orientation results (S155: second rectification step), and another 3D measurement is performed (S160: second 3D measurement step). Because the second orientation step, the second rectification step and the second 3D measurement step are performed after removal of the erroneous corresponding points, that is, the inappropriate corresponding feature points detected, more precise orientation results and hence 3D coordinates can be obtained. By repeating this loop of processes (S140 to S190), the measurement precision can be improved. The loop of processes is repeated until no more erroneous corresponding points are detected. When the conditions necessary for establishing 3D coordinates are satisfied, the 3D coordinates are established in S195 of FIG. 3, and the measurement is ended.

Figure 11:
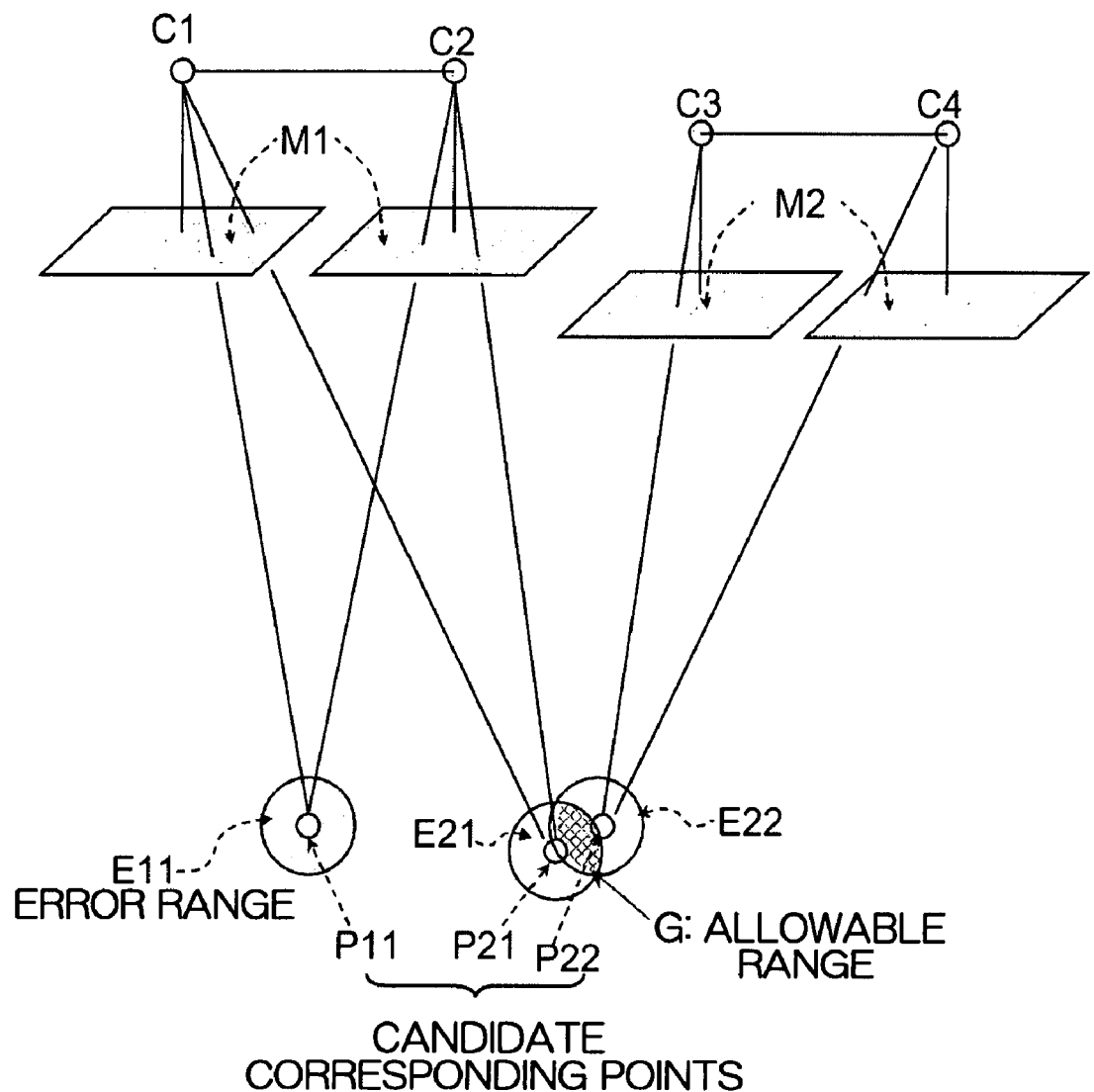
FIG. 11 schematically shows an error range.

FIG. 11 schematically shows an error range. The drawing shows the measurement coordinates P11 and P21 of the corresponding feature points P1 and P2 (not shown) measured based on the rectified image M1 photographed with the stereo cameras C1 and C2, and the error ranges E11 and E21 thereof. The drawing also shows the measurement position P22 of the corresponding feature point P2 measured based on the rectified image M2 photographed with the stereo cameras C3 and C4, and the error range E22 thereof. An overlapping range between the error range E21 and the error range E22 is shown as the allowable range G.

Figure 12:
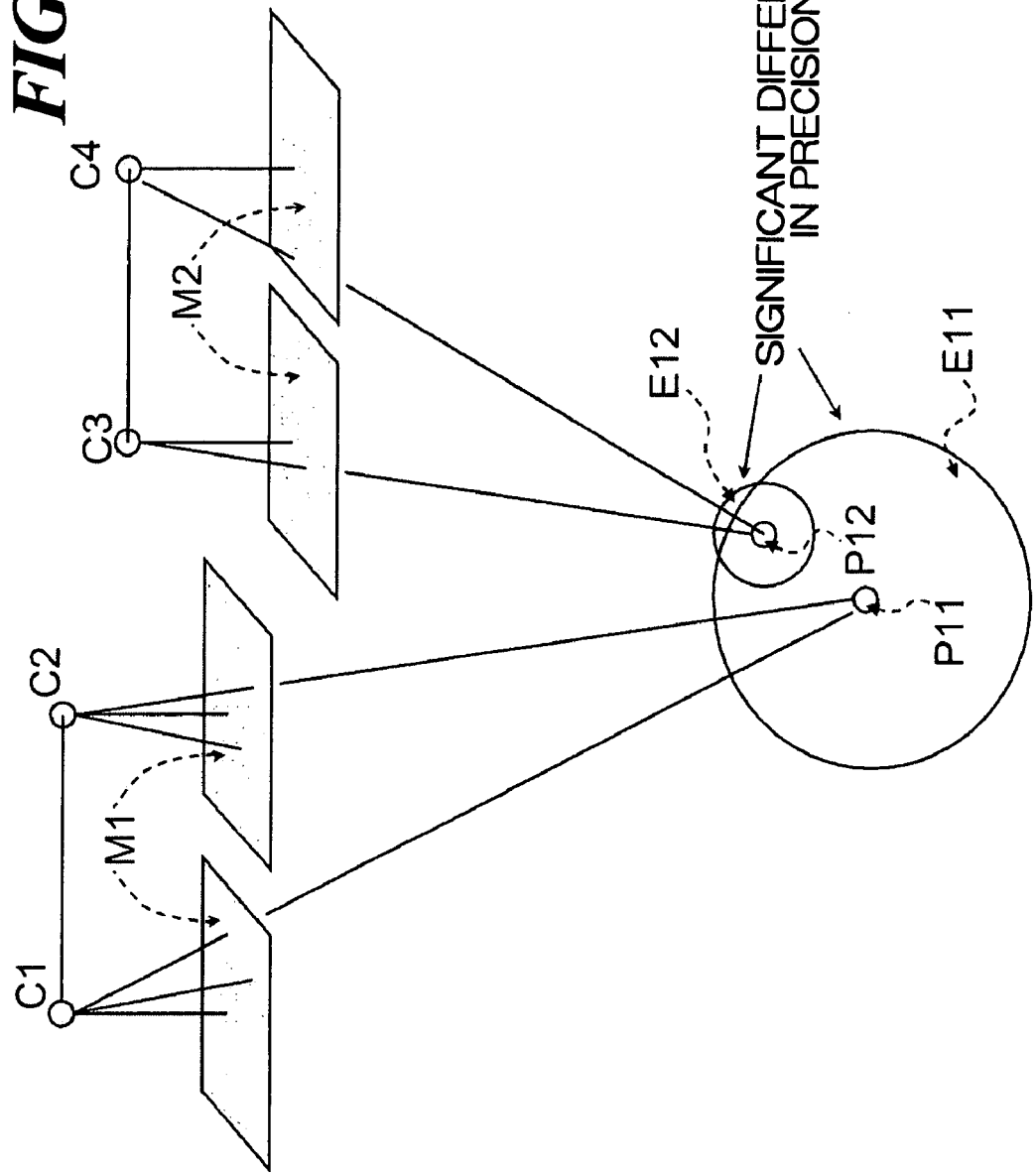
FIG. 12 shows an example of the error range of stereo images.

FIG. 12 shows an example of the error range of stereo images. The drawing shows the measurement coordinate P11 of the corresponding feature point P1 (not shown) measured based on the rectified image M1 photographed with the stereo cameras C1 and C2, and the error range E11 thereof, and the measurement coordinate P12 of the corresponding feature point P1 measured based on the rectified image M2 photographed with the stereo cameras C3 and C4, and the error range E12 thereof. Here, a threshold may be set for the error range, for example, so that those corresponding feature points with the error range exceeding the threshold can be deleted. For example, stereo images may be selected after removing stereo images first with too large an error range and hence with poor precision.

Figure 13:
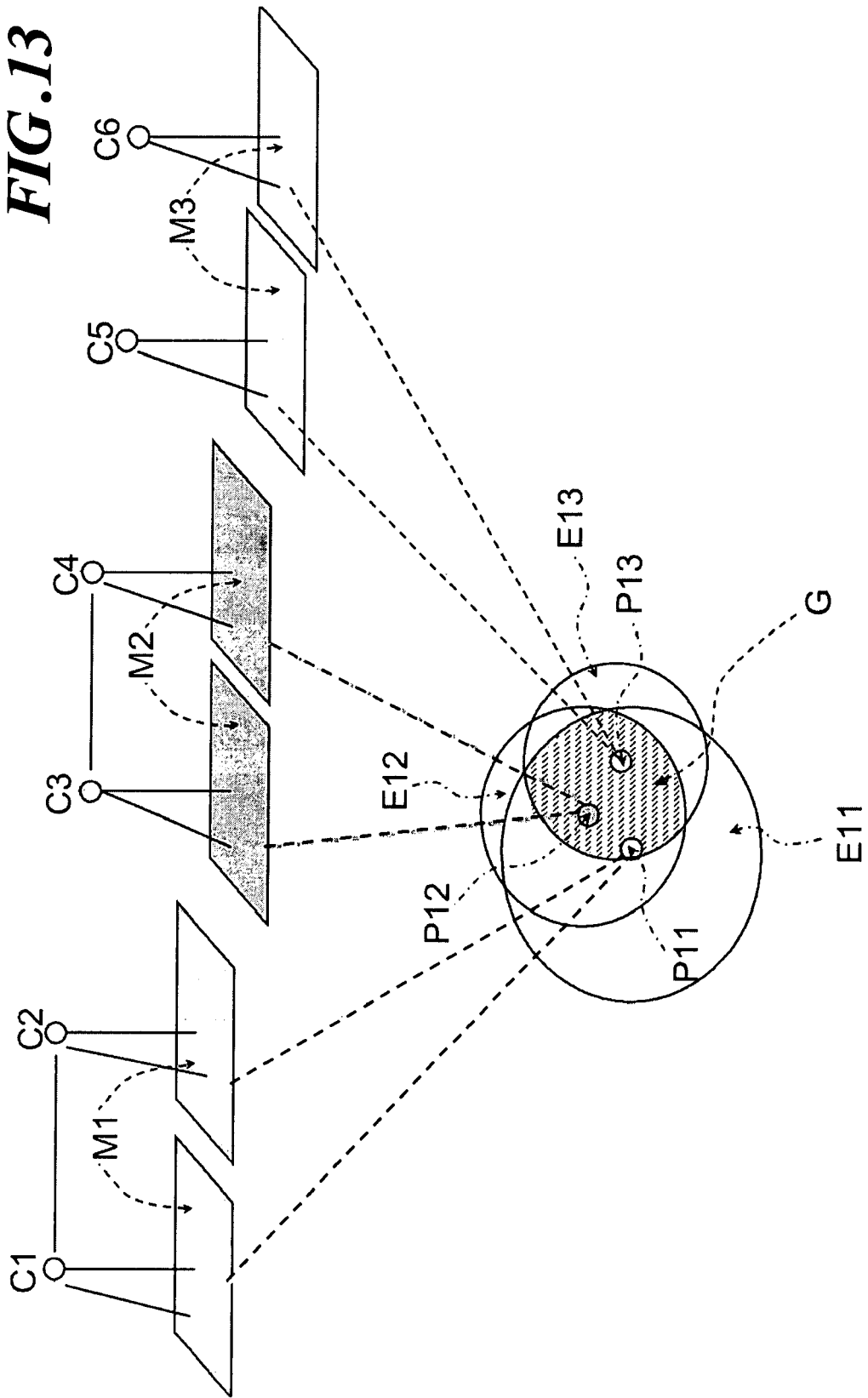
FIG. 13 shows another example of the error range of stereo images.

FIG. 13 shows another example of the error range of stereo images. The drawing shows the measurement coordinate P11 of the corresponding feature point P1 (not shown) measured based on the rectified image M1 photographed with the stereo cameras C1 and C2, and the error range E11 thereof, the measurement coordinate P12 of the corresponding feature point P1 measured based on the rectified image M2 photographed with the stereo cameras C3 and C4, and the error range E12 thereof, and the measurement coordinate P13 of the corresponding feature point P1 measured based on the rectified image M3 photographed with the stereo cameras C5 and C6, and the error range E13 thereof. An overlapping area of the error ranges E11, E12 and E13 of the stereo images is set as the allowable range G. In this example, because all the measurement points P11 to P13 are in the allowable range G and the respective error ranges E11, E12 and E13 overlap the allowable range G, the measurement points P11 to P13 are preserved as allowable corresponding points.

Figure 14:
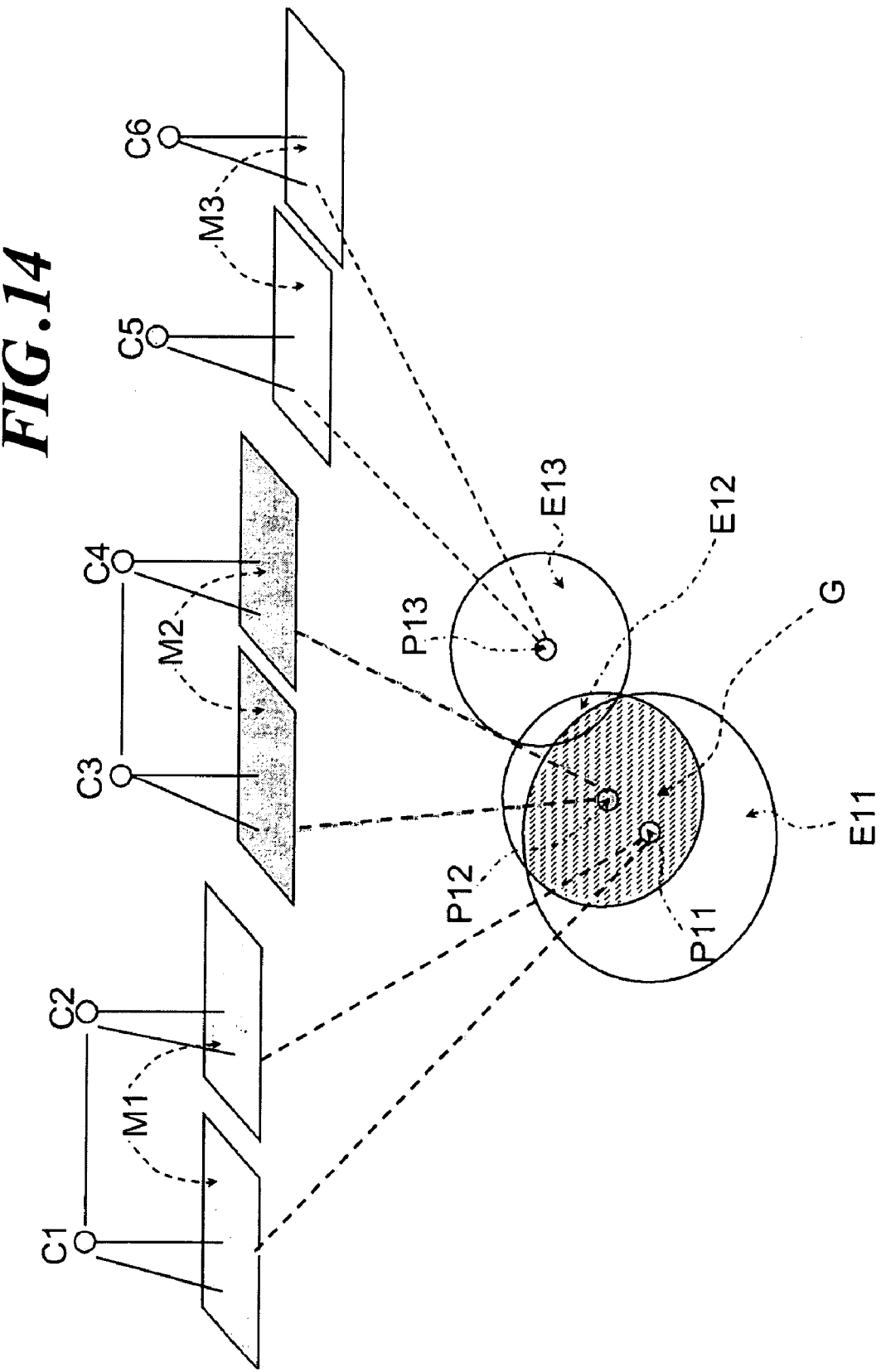
FIG. 14 shows still another example of the error range of stereo images.

FIG. 14 shows still another example of the error range of stereo images. The drawing shows the measurement coordinate P11 of the corresponding feature point P1 (not shown) measured based on the rectified image M1 photographed with the stereo cameras C1 and C2, and the error range E11 thereof, the measurement coordinate P12 of the corresponding feature point P1 measured based on the rectified image M2 photographed with the stereo cameras C3 and C4, and the error range E12 thereof, and the measurement coordinate P13 of the corresponding feature point P1 measured based on the rectified image M3 photographed with the stereo cameras C5 and C6, and the error range E13 thereof. With an overlapping range between the measurement points P11 and P12 set as the allowable range G, the measurement points P11 and P12 are contained in the allowable range G, while the measurement point P13 exists away from the allowable range G. However, the error range E13 of the measurement point P13 overlaps the allowable range G, that is, all the error ranges E11, E12 and E13 overlap each other. Thus, all the measurement points P11, P12 and P13 are preserved as allowable corresponding points.

Figure 15:
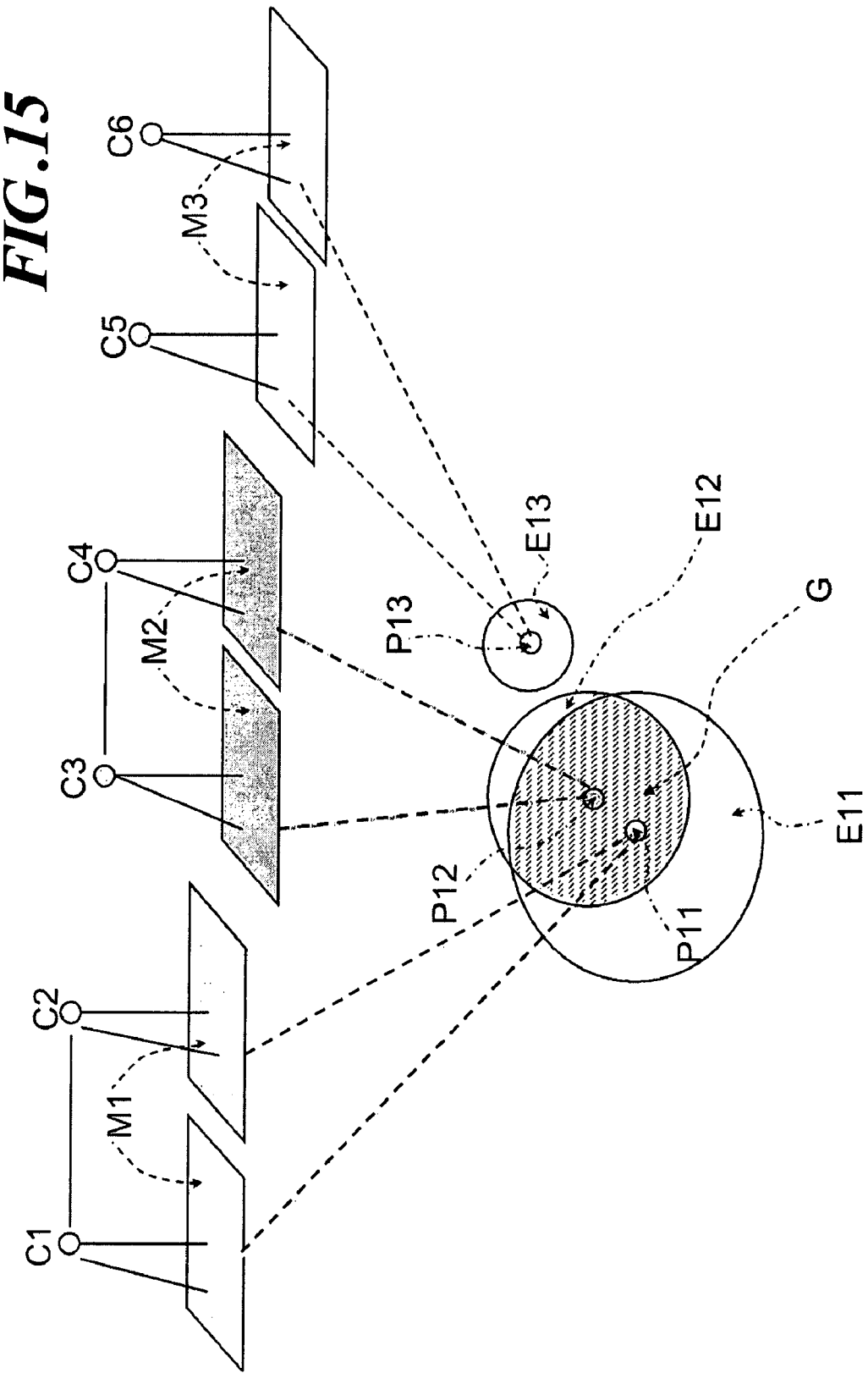
FIG. 15 shows still another example of the error range of stereo images.

FIG. 15 shows still another example of the error range of stereo images. The drawing shows the measurement coordinate P11 of the corresponding feature point P1 (not shown) measured based on the rectified image M1 photographed with the stereo cameras C1 and C2, and the error range E11 thereof, the measurement coordinate P12 of the corresponding feature point P1 measured based on the rectified image M2 photographed with the stereo cameras C3 and C4, and the error range E12 thereof, and the measurement coordinate P13 of the corresponding feature point P1 measured based on the rectified image M3 photographed with the stereo cameras C5 and C6, and the error range E13 thereof. With an overlapping range between the measurement points P11 and P12 set as the allowable range G, the measurement points P11 and P12 are contained in the allowable range G, while the measurement point P13 exists away from the allowable range G. In addition, the error range E13 of the measurement point P13 does not overlap the error range G. Thus, the measurement points P11 and P12 are preserved as allowable corresponding points, while the measurement point P13 is excluded as an unallowable corresponding point.

[Another Orientation Process/3D Measurement]

Then, another stereo image selection (S140), another orientation (S150: second orientation step), another rectification process (S155: second rectification step) and another 3D measurement (S160: second 3D measurement step) are performed using those corresponding feature points excluding the corresponding feature points deleted by the corresponding point evaluation/removal section 8. In these steps, detected erroneous corresponding points, that is, inappropriate corresponding feature points are removed and the process is performed. Because these steps are repeated until there are no corresponding feature points determined as inappropriate, it is possible to calculate the 3D coordinates with high precision.

As has been described above, this embodiment can provide an image processing device and method that can precisely measure the photographing position or posture of a photographing device or the coordinates of an object based on sequentially changing photographed images, such as moving images, where it is required to identify and delete those feature points and corresponding points inappropriate for 3D measurement, by performing 3D measurement after removing such inappropriate feature points and corresponding points.

Second Embodiment

In the first embodiment, the appropriateness of feature points is determined based on whether or not overlap between the allowable range and the error range exists. In the second embodiment, the appropriateness of feature points is determined based on whether or not the corresponding feature points exist inside the allowable range. That is, those corresponding feature points existing inside the allowable range are determined as appropriate, and those existing outside the allowable range as inappropriate. This embodiment is otherwise similar to the first embodiment.

According to this embodiment, in the example of FIG. 13, all the measurement points P11 to P13 are contained in the allowable range G, and thus preserved as allowable corresponding points. In the example of FIG. 14, with an overlapping range between the measurement points P11 and P12 set as the allowable range G, the measurement points P11 and P12 are contained in the allowable range G and thus preserved as allowable corresponding points, while the measurement point P13 exists away from the allowable range G and thus is deleted as an unallowable corresponding point. In the example of FIG. 15, as in the example of FIG. 14, the measurement points P11 and P12 are preserved as allowable corresponding points, while the measurement point P13 is deleted as an unallowable corresponding point. According to this embodiment, corresponding feature points with high accuracy can be selected for use in 3D measurement, thus improving the precision of the 3D coordinates.

Third Embodiment

In the first embodiment, the appropriateness of feature points is determined based on whether or not overlap between the allowable range and the error range exists. In the third embodiment, the corresponding point appropriateness determination section 83 determines as inappropriate those corresponding feature points in the stereo images with the error range, for example obtained from the equations (8) and (9), exceeding a predetermined threshold. This embodiment is otherwise similar to the first embodiment.

According to this embodiment, a threshold may be set for the error range in the example of FIG. 12, so as to delete those corresponding feature points with the error range exceeding the threshold. For example, in the case where the error range E11 of the measurement point P11 exceeds the threshold, the corresponding feature point P11 is determined as inappropriate and excluded as an unallowable corresponding point. In this case, the allowable range setting section 82 of FIG. 2 and the allowable range setting step of FIG. 3 may be omitted.

This embodiment may be combined with the first or second embodiment. In such a case, those measurement points with the error range exceeding the threshold are first deleted, and the appropriateness of feature points is then determined, based on whether or not overlap between the allowable range and the error range exists or based on whether or not the corresponding feature points exist inside the allowable range. According to this embodiment, stereo images with a small error range can be used for 3D measurement, thus increasing the precision of the 3D coordinates. In addition, inappropriate corresponding feature points can be automatically removed using a predetermined threshold.

Fourth Embodiment

In the first embodiment, the appropriateness of feature points is determined based on whether or not overlap between the allowable range and the error range exists. In the fourth embodiment, the allowable range is further utilized to obtain the positional coordinates of the corresponding points. This embodiment is otherwise similar to the first embodiment. Because those corresponding feature points with an error range overlapping the allowable range are highly likely to be the actual corresponding points, the center of gravity of all such corresponding feature points is obtained using a weighting factor, and determined as the positional coordinates of such corresponding feature points. The weighting factor is 1 or a decreasing function of the error range, for example the reciprocal of the error range ($1/\sigma_{xy}$, $1/\sigma_z$). According to this embodiment, the positional coordinates of the corresponding feature points can be determined with generally high accuracy. In the case where this embodiment is combined with the third embodiment in which those corresponding feature points with the error range exceeding a predetermined threshold are determined as inappropriate, the error range is within a constant level and thus the weighting factor used to obtain the center of gravity may be 1.

Fifth Embodiment

In the first embodiment, a rectification process is performed on the images. In the fifth embodiment, the rectification process is omitted. This embodiment is otherwise similar to the first embodiment.

Figure 16:
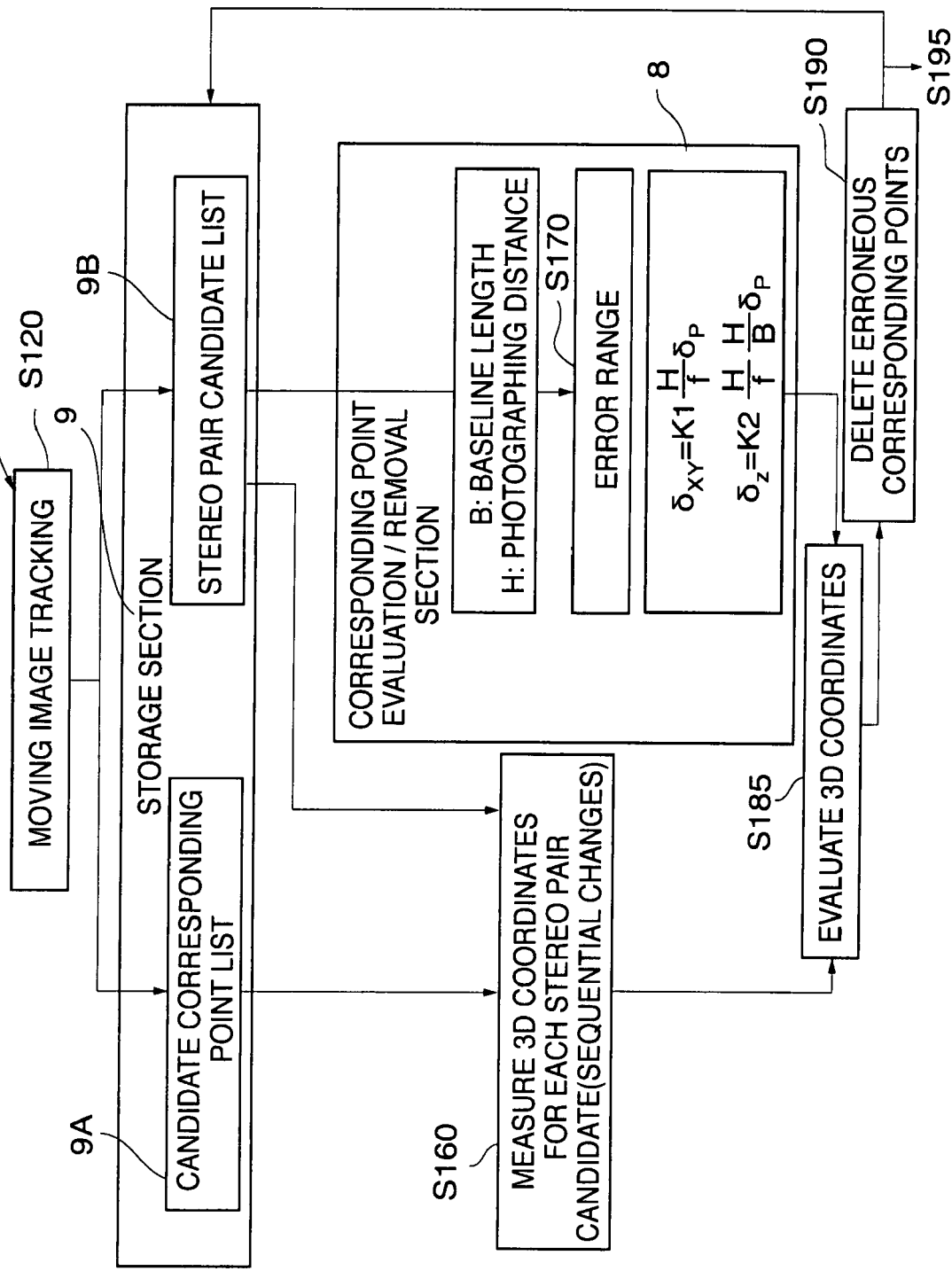
FIG. 16 shows an exemplary process flow of removing erroneous corresponding points in a fifth embodiment.

FIG. 16 shows an exemplary flow of removing erroneous corresponding points in the fifth embodiment. Compared to the exemplary process flow of the first embodiment shown in FIGS. 3 and 10, this flow does not include a rectification process (S155), with the orientation process (S150) followed by the 3D coordinate calculation (S160). Displacements in position and tilt of the cameras can be obtained by the orientation. Using the values, the 3D coordinates of the corresponding feature points can be calculated without actually converting the images. Other steps of this embodiment are similar to those of the first embodiment. In this case, the precision equations may include a parameter representing rotation of the cameras. Within the allowable error range, the precision equations (8) and (9) might be utilized as they are, while different precision equations should be used, to be exact, in order to determine the error and allowable ranges. The 3D coordinates in this series of processes may be defined in an absolute coordinate system or a relative coordinate system where the cameras alone exist.

Sixth Embodiment

In the first embodiment, the photographing position is measured based on the corresponding point tracking results. The sixth embodiment includes a photographing position measurement section incorporating a GPS, so that the photographing position can be measured otherwise. This embodiment is otherwise similar to the first embodiment.

Figure 17:
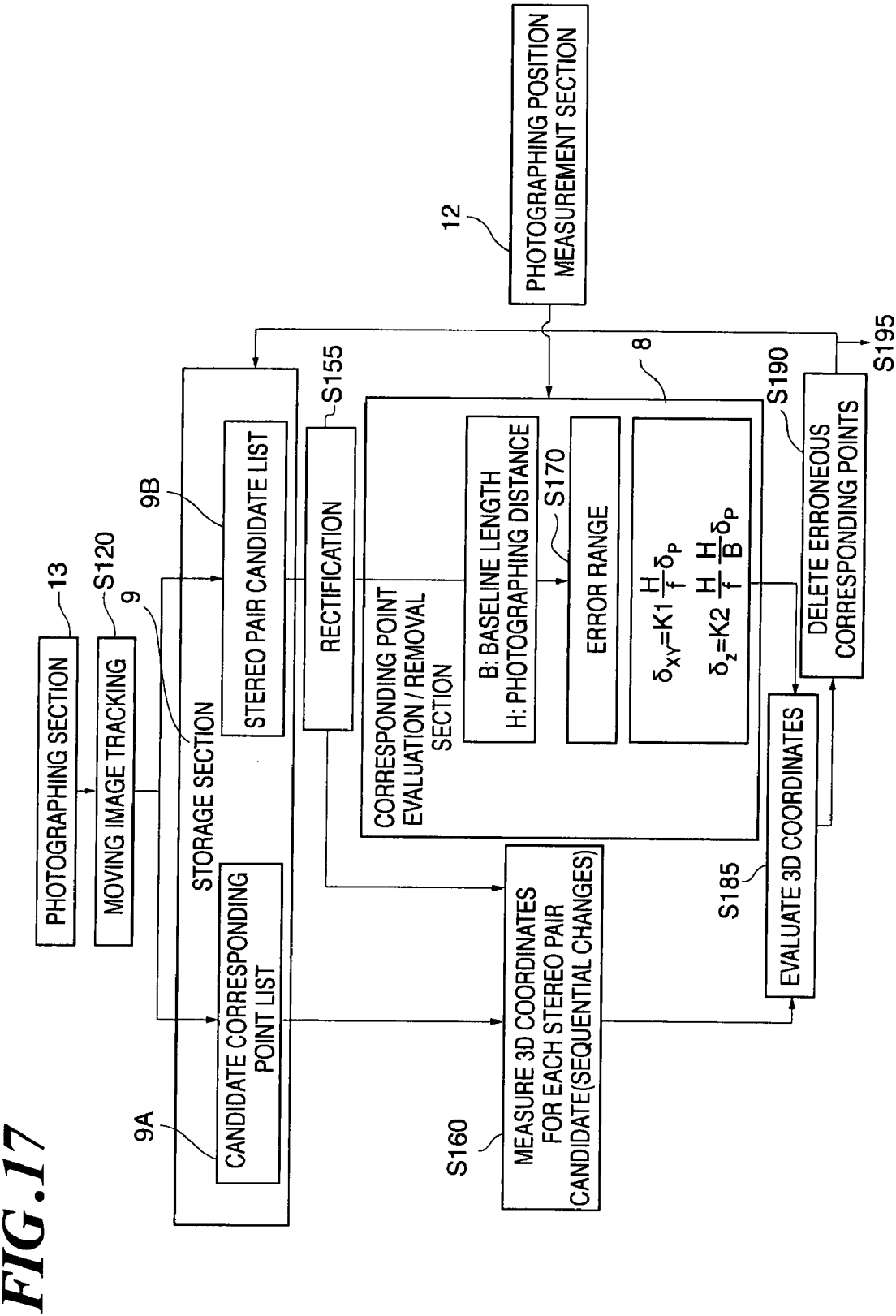
FIG. 17 shows an exemplary process flow of removing erroneous corresponding points in a sixth embodiment.

FIG. 17 shows an exemplary flow of removing erroneous corresponding points in the sixth embodiment. Compared to the exemplary process flow of the first embodiment shown in FIG. 10, a photographing position measurement section 12 is additionally provided, so that the photographing position can be measured not based on the photographed images. This embodiment is convenient for real time processing, because the photographing position can be measured without tracking the photographed images and independently of the photographed images. In addition, the photographing position measurement results obtained in the photographed image tracking process can be compensated for. Other steps of this embodiment are similar to those of the first embodiment. A photographing device 13 is also added to allow for on-site photographing.

The photographing position measurement section 12 may be a GPS (Global Positioning System) sensor, etc. For example, in the case where the photographing position measurement section 12 is a GPS, the 3D coordinates of the photographing location are output from the GPS. In the error range calculation process (S170), the baseline length B is calculated using the output data from the GPS, and the photographing distance H is calculated based on the values of the 3D coordinates of the corresponding feature points calculated in the 3D coordinate calculation step (S160) and the photographing position data output from the GPS, in order to calculate the error range from the equations (8) and (9).

Seventh Embodiment

In the seventh embodiment, an inertial sensor is used as the photographing position measurement section 12 in the sixth embodiment. The baseline length can be obtained from data obtained by tracking the photographing position with the inertial sensor. The inertial sensor may be, for example, a sensor that can measure the position, speed, acceleration, angle or angular speed. The precision of the coordinates of the photographing position can be increased by comparing values obtained from the sensor and those obtained by tracking the photographed images.

Eighth Embodiment

In the first embodiment, as shown in FIG. 3, the steps of selecting stereo images (S140) to deleting erroneous corresponding points (S190) are executed in a loop. In this embodiment, the precision in the determination as to the appropriateness of corresponding points is varied according to the number of loops. That is, as the number of loops increases, the precision in the evaluation of 3D coordinates, that is, the determination as to the appropriateness of corresponding points, can be increased. For example, a smaller error range ($\sigma_{xy}$, $\sigma_z$) can be given by stereo images with a larger baseline length B, and also by smaller coefficients k1 and k2. For example, the baseline length in the second loop may be twice that in the first loop, and the coefficients k1 and k2 in the second loop may be half those in the first loop, etc. This embodiment is otherwise similar to the first embodiment.

Ninth Embodiment

In the first embodiment, a stereo pair candidate list is prepared in the stereo image information memory 9B, thus allowing for preparation of error range data representing the correspondence between the stereo images and the error range. In the ninth embodiment, the storage section 9 stores, in the stereo image information memory 9B, data indicating an assumed error range in measurement obtained by substituting necessary measurement elements (such as H: photographing distance, $\Delta p$: pixel resolution, f: focal length, B: baseline length, and k1 and k2: coefficients) into the equations (8) and (9) representing the correspondence between the stereo images and the error range. Also, the stereo image selection section 6 selects stereo images with an error range not more than a predetermined threshold, or with an error range within a predetermined range, based on the error range data. The stereo image selection section 6 can select stereo images with an error range not more than a predetermined threshold, or with an error range within a predetermined range, based on the error range data representing the correspondence between the stereo images and the error range. In the former case, stereo images with a small error range can be selected for use in 3D measurement, thus increasing the precision of the 3D coordinates. In the latter case, stereo images with uniform error ranges (for example, where the photographing distance is approximately equal) can be used to obtain uniform measurement results. This embodiment is otherwise similar to the first embodiment.

Tenth Embodiment

In the tenth embodiment, the storage section 9 stores, in the corresponding point information memory 9A, data indicating an assumed error range in measurement obtained by substituting necessary measurement elements (such as H: photographing distance, $\Delta p$: pixel resolution, f: focal length, B: baseline length, and k1 and k2: coefficients) into the equations (8) and (9) representing the correspondence between the corresponding feature points and the allowable range. Also, the stereo image selection section 6 selects stereo images with an error range overlapping the allowable range. Once the appropriateness of corresponding points has been determined, it is determined whether or not the error range of each corresponding feature point overlaps the allowable range. The determination results are stored in the corresponding point information memory 9A, in order for the corresponding point information memory 9A to have error range data representing the correspondence between the corresponding feature points and the error range. The stereo image selection section 6 can reference the error range data so as to select stereo images with an error range overlapping the allowable range. In this way, corresponding feature points with high possibility of being real feature points can be selected for use in 3D measurement, whereby high-precision 3D coordinates can be obtained. This embodiment is otherwise similar to the first embodiment.

Eleventh Embodiment

In the eleventh embodiment, the storage section 9 (see FIG. 2) stores data of the baseline length satisfying the required precision obtained by substituting the measurement precision obtained by measurement and necessary measurement elements (such as H: photographing distance, $\Delta p$: pixel resolution, f: focal length, and k1 and k2: coefficients), utilizing the equation (9) representing the relationship between the baseline length of stereo images and the measurement precision of 3D coordinates. In this example, the stereo image selection section 6 selects stereo images with a baseline length satisfying the required precision. Since the measurement precision depends on the baseline length, 3D measurement results satisfying the required precision can be obtained by determining the baseline length of stereo images according to the required precision. This embodiment is otherwise similar to the first embodiment.

Twelfth Embodiment

In the first embodiment, the object to be photographed is stationary while the photographing device moves. In the twelfth embodiment, the photographing device is stationary while the object to be photographed moves. Also in this case, a moving object other than the intended object may intervene between the photographing device and the object, or the photographing device may sway. In such cases, feature points can be tracked to obtain the 3D coordinates of the feature points of the object in sequentially changing photographed images, such as moving images. The present invention is also applicable to a rotating object having feature points that disappear and reappear repetitively. The present invention is also applicable to each of a plurality of objects that move differently from each other.

Thirteenth Embodiment

In the thirteenth embodiment, a moving object is identified. Since each corresponding feature point transmits sequentially, it is possible to identify a moving object based on the values of the 3D coordinates obtained as a result of the above processes. That is, a sequential 3D coordinate list may be prepared, so that those corresponding feature points that change the position from certain 3D coordinate values in the sequence can be determined as those on a moving body.

The present invention can be implemented in the form of a computer program for causing a computer to perform the image processing method described in the above embodiments. The program may be stored in an internal memory of the control section 1, stored in a storage device internally or externally of the system, or downloaded via the Internet. The present invention may also be implemented as a storage medium storing the program.

The embodiments of the present invention have been described above. It should be understood that the present invention is not limited to the above embodiments, but various modifications may be made to the embodiments without departing from the scope of the present invention.

For example, in the above embodiments, photographed images are acquired while either one of the object or the photographing device is moving and the other is standing still. However, the present invention is also applicable to the case where both of them are moving. For example, the present invention is fully applicable to the case where one of them is moving at a constant speed in a constant direction. Even if the removal of abnormal values in the tracking process is omitted, inappropriate feature points can be removed using the error range in the present invention. The removal of feature points based on the error range in the present invention may be performed after peculiar feature points have been removed based on the difference in movement vector beforehand in the tracking process. Although a MORAVEC operator is used to extract feature points and SSDA template matching is used for the template matching in the embodiments, other operators and template matching methods may be used. The number of stereo images, the baseline length and the number of feature points may be selected appropriately.

The present invention is for use to measure the positional coordinates of a photographing device or an object to be photographed using moving images.

DESCRIPTION OF REFERENCE NUMERALS AND SYMBOLS

1: control section
2: photographed image acquisition section
3: feature extraction section
4: feature point tracking section
5: computation processing section
6: stereo image selection section
7: orientation process/3D measurement section
8: corresponding point evaluation/removal section
9: storage section
9A: corresponding point information memory
9B: stereo image information memory
10: image memory
11: display section
12: photographing position measurement section
13: photographing section
81: error range calculation section
82: allowable range setting section
83: corresponding point appropriateness determination section
84: erroneous corresponding point deletion section
100: image processing device
A: object
B: baseline length
C: screen distance
C1-C6: first to sixth photographing position
E11-E13, E21-E23: error range
f focal length
G: allowable range
H: photographing distance
I: photographed image
M, M1-M3: rectified image
P, P1, P2: corresponding point
P11-P13, P21-P23: measurement point

What is claimed is:

1. An image processing device comprising:
a photographed image acquisition section for acquiring a series of sequentially photographed images of a relatively moving object where three or more adjacent images have an overlapping area with each other, the photographed image acquisition section including or communicating with a photographing device for photographing the series of photographed images;
a feature extraction section for extracting feature points from any of the sequentially photographed images;
a feature point tracking section for tracking and correlating the feature points for the series of photographed images;
a stereo image selection section for selecting stereo images from the series of photographed images, the stereo images being a pair of images;
an orientation process/three-dimensional (3D) measurement section for determining orientation of the photographing device using a corresponding feature points and for performing a 3D measurement to measure 3D coordinates of the corresponding feature points using the corresponding feature points, the corresponding feature points being the feature points correlated in the stereo images selected by the stereo image selection section;
an error range calculation section for calculating an error range of 3D coordinates;
a corresponding point appropriateness determination section for determining whether or not the corresponding feature points are appropriate for 3D measurement based on the error range of the 3D coordinates of the corresponding feature points calculated by the error range calculation section;
an erroneous corresponding point deletion section for deleting corresponding feature points determined as inappropriate by the corresponding point appropriateness determination section; and
an allowable range setting section for setting an overlapping area of the three or more error ranges of the 3D coordinates, for an identical point on the object, obtained from different stereo images as an allowable range of the 3D coordinates;

wherein the corresponding point appropriateness determination section determines those corresponding feature points in the stereo images used to measure the 3D coordinates without an overlapping area between the error range and the allowable range as inappropriate, wherein the error range is calculated as a function of a baseline length, a photographing distance, a focal length and a pixel size.

2. The image processing device as recited in claim 1, wherein the orientation process/3D measurement section performs another orientation and another 3D measurement using those corresponding feature points excluding the corresponding feature points deleted by the erroneous corresponding point deletion section.

3. The image processing device as recited in claim 1, wherein the corresponding point appropriateness determination section determines as inappropriate those corresponding feature points in the stereo images used to measure the 3D coordinates with the error range exceeding a predetermined threshold.

4. The image processing device as recited in claim 3, further comprising:
a storage section for storing data indicating an assumed error range in a measurement based on correspondence between the stereo images and the error range,
wherein the stereo image selection section selects stereo images with an error range not more than a predetermined threshold based on the error range data.

5. The image processing device as recited in claim 3, further comprising:
a storage section for storing data indicating an assumed error range in a measurement based on correspondence between the stereo images and the error range,
wherein the stereo image selection section selects stereo images with an error range within a predetermined range based on the error range data.

6. The image processing device as recited in claim 1, wherein the corresponding point appropriateness determination section determines those corresponding feature points used to measure the 3D coordinates existing inside the allowable range as appropriate, and those used to measure the 3D coordinates existing outside the allowable range as inappropriate.

7. The image processing device as recited in claim 1, wherein the allowable range setting section sets, as an allowable range of the 3D coordinates, an overlapping area of the error ranges in most of the 3D coordinates obtained from the stereo images or an overlapping area of the error ranges in a predetermined number or more of the 3D coordinates obtained from the stereo images.

8. The image processing device as recited in claim 7, wherein a center of gravity of the 3D coordinates with an overlapping area between the allowable range and the error range is obtained using a weighting factor that is 1 or a decreasing function of the error range, and the center of gravity is determined as a positional coordinate of the 3D coordinates.

9. The image processing device as recited in claim 1, wherein the orientation process/3D measurement section forms rectified images by rectifying the stereo images, and performs a 3D measurement based on the rectified images.

10. The image processing device as recited in claim 1, further comprising:

a storage section for storing data indicating an assumed error ranges in a measurement based on correspondence between the corresponding feature points and the allowable range,
wherein the stereo image selection section selects stereo images with an error range overlapping the allowable range based on the error range data.

11. The image processing device as recited in claim 1, further comprising:
a storage section for storing data of a baseline length satisfying required precision obtained using necessary measurement elements and measurement precision obtained by measurement, utilizing a relation between the baseline length of the stereo images and the measurement precision of the 3D coordinates,
wherein the stereo image selection section selects stereo images with a baseline length satisfying the required precision based on the baseline data.

12. The image processing device as recited in claim 1, further comprising:
a photographing position measurement section that can measure a photographing position without being based on the photographed images.

13. The image processing device as recited in claim 1, further comprising:
a display device for presenting a stereoscopic two-dimensional display of the error range or the allowable range.

14. A method for processing an image, comprising:
a photographed image acquisition step of acquiring, by means of a photographing device, a series of sequentially photographed images of a relatively moving object where three or more adjacent images have an overlapping area with each other;
a feature extraction step of extracting feature points from any of the sequentially photographed images;
a feature point tracking step of tracking and correlating the feature points for the series of photographed images;
a stereo image selection step of selecting stereo images from the series of photographed images, the stereo images being a pair of images;
a first orientation step of an determining orientation of the photographing device using corresponding feature points, the corresponding feature points being the correlated feature points in the stereo images selected in the stereo image selection step;
a first 3D measurement step of performing a 3D measurement to measure 3D coordinates of the corresponding feature points using orientation results in the first orientation step;
an error range calculation step of calculating an error range of 3D coordinates;
a corresponding point appropriateness determination step of determining whether or not the corresponding feature points are appropriate for 3D measurement based on the error range of the 3D coordinates of the corresponding feature points calculated in the error range calculation step;
an erroneous corresponding point deletion step of deleting those corresponding feature points determined as inappropriate in the corresponding point appropriateness determination step; and
an allowable range setting step of setting an overlapping area of the three or more error ranges of the 3D coordinates, for an identical point on the object, obtained from different stereo images as an allowable range of the 3D coordinates;

wherein the corresponding point appropriateness determination step determines those corresponding feature points in the stereo images used to measure the 3D coordinates without an overlapping area between the error range and the allowable range as inappropriate; and wherein the error range is calculated as a function of a baseline length, a photographing distance, a focal length and a pixel size.

15. The method for processing an image as recited in claim 14, further comprising:

a second orientation step of performing another orientation using those corresponding feature points excluding the corresponding feature points deleted in the erroneous corresponding point deletion step; and a second 3D measurement step of performing a 3D measurement using orientation results in the second orientation step.

* * * * *